United States Patent
Ashiura et al.

(10) Patent No.: US 12,540,231 B2
(45) Date of Patent: *Feb. 3, 2026

(54) SILANE COUPLING AGENT COMPOSITION AND RUBBER COMPOSITION COMPRISING SAME

(71) Applicant: ENEOS Corporation, Tokyo (JP)

(72) Inventors: Makoto Ashiura, Tokyo (JP); Keisuke Chino, Tokyo (JP); Yusuke Matsuo, Tokyo (JP); Toshiyuki Tsutsumi, Tokyo (JP); Keitaro Iwasaki, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 525 days.

This patent is subject to a terminal disclaimer.

(21) Appl. No.: 18/002,263

(22) PCT Filed: Jun. 4, 2021

(86) PCT No.: PCT/JP2021/021309
§ 371 (c)(1),
(2) Date: Dec. 17, 2022

(87) PCT Pub. No.: WO2021/256292
PCT Pub. Date: Dec. 23, 2021

(65) Prior Publication Data
US 2023/0340230 A1    Oct. 26, 2023

(30) Foreign Application Priority Data
Jun. 18, 2020  (JP) ................. 2020-105619

(51) Int. Cl.
*C08K 5/54* (2006.01)
*B60C 1/00* (2006.01)
(Continued)

(52) U.S. Cl.
CPC ............ *C08K 5/548* (2013.01); *B60C 1/0016* (2013.01); *C07F 7/1804* (2013.01); *C08K 3/04* (2013.01);
(Continued)

(58) Field of Classification Search
CPC . C08K 5/548; C08K 5/21; C08K 5/31; C08K 5/54; C08K 3/04; C08K 3/36; C08K 2201/014; C07F 7/1804; B60C 1/0016
(Continued)

(56) References Cited

U.S. PATENT DOCUMENTS 5,534,599 A      7/1996   Sandstrom et al.
12,024,615 B2 *  7/2024   Chino ................. C08J 3/203
(Continued)

FOREIGN PATENT DOCUMENTS

JP   H08-259736 A   10/1996
JP   H11-335381 A   12/1999
(Continued)

OTHER PUBLICATIONS

China National Intellectual Property Administration, Office Action in Chinese Patent Application No. 202180043410.2 (Dec. 28, 2024).
(Continued)

*Primary Examiner* — Ruiyun Zhang
(74) *Attorney, Agent, or Firm* — Leydig, Voit & Mayer, Ltd.

(57) ABSTRACT

Provided is a silane coupling agent composition with which it is possible to obtain a rubber composition having excellent scorch resistance and a crosslinked product of a rubber composition having excellent viscoelastic properties. The silane coupling agent composition of the invention includes a silane compound and a protein denaturant and/or a
(Continued)

silanization reaction accelerator, in which the silane compound includes a first silane compound represented by the following Formula (1) and a second silane compound represented by the following Formula (11):

Formula (1)

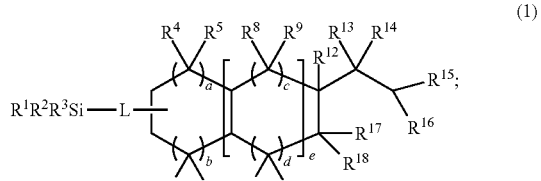

Formula (11)

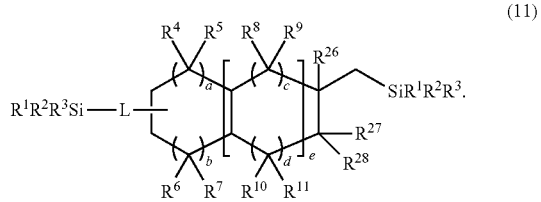

17 Claims, 7 Drawing Sheets

(51) Int. Cl.
    *C07F 7/18*     (2006.01)
    *C08K 3/04*     (2006.01)
    *C08K 3/36*     (2006.01)
    *C08K 5/21*     (2006.01)
    *C08K 5/31*     (2006.01)
    *C08K 5/548*     (2006.01)
(52) U.S. Cl.
    CPC ................. *C08K 3/36* (2013.01); *C08K 5/21* (2013.01); *C08K 5/31* (2013.01); *C08K 5/54* (2013.01); *C08K 2201/014* (2013.01)

(58) Field of Classification Search
    USPC ........................................................ 524/262
    See application file for complete search history.

(56) References Cited

U.S. PATENT DOCUMENTS

| | | | |
|---|---|---|---|
| 2019/0085003 A1 | 3/2019 | Chino et al. | |
| 2023/0312879 A1* | 10/2023 | Ashiura | C08K 3/36 |
| | | | 524/269 |
| 2023/0340231 A1* | 10/2023 | Ashiura | C08K 5/548 |

FOREIGN PATENT DOCUMENTS

| | | |
|---|---|---|
| JP | 2004-099696 A | 4/2004 |
| JP | 2010-111722 A | 5/2010 |
| JP | 2014-177430 A | 9/2014 |
| JP | 2014-177432 A | 9/2014 |
| JP | 2014-177580 A | 9/2014 |
| JP | 2016-074844 A | 5/2016 |
| JP | 2016-113515 A | 6/2016 |
| WO | WO 2017/146103 A1 | 8/2017 |
| WO | WO 2017/188411 A1 | 11/2017 |
| WO | WO 2020/138056 A1 | 7/2020 |
| WO | WO 2020/250824 A1 | 12/2020 |

OTHER PUBLICATIONS

Korean Intellectual Property Office, Office Action in Korean Patent Application No. 10-2022-7044210 (Dec. 9, 2024).
European Patent Office, Extended Search Report in European Patent Application No. 21825448.0 (Jun. 12, 2024).
Japan Patent Office, International Preliminary Report on Patentability in International Patent Application No. PCT/JP2021/021309 (Dec. 29, 2022).
Japan Patent Office, Office Action in Japanese Patent Application No. 2022-531659 (Sep. 27, 2024).
Japan Patent Office, International Search Report in International Patent Application No. PCT/JP2021/021309 (Jul. 20, 2021).
Taiwan Intellectual Property Office, Office Action in Taiwanese Patent Application No. 110120401 (Nov. 1, 2024).

* cited by examiner

US 12,540,231 B2

SILANE COUPLING AGENT COMPOSITION AND RUBBER COMPOSITION COMPRISING SAME

BACKGROUND OF THE INVENTION

Technical Field

The present invention relates to a silane coupling agent composition and a rubber composition comprising the same. The present invention also relates to a crosslinked product of the rubber composition and a tire using the rubber composition.

Background Art

Conventionally, a silane compound having a reactive functional group and a hydrolyzable group has been used as a component of a silane coupling agent in order to improve the dispersibility of an organic polymer material such as rubber and an inorganic material such as silica in a rubber composition.

Usually, such a silane compound has a substituent such as a mercapto group, a polysulfide group, an amino group, or an epoxy group as a reactive functional group having high reactivity with an organic polymer material such as rubber and a substituent such as an alkoxysilyl group as a hydrolyzable group having high reactivity with an inorganic material such as silica. For example, Patent Literature 1 discloses a rubber composition containing a polysulfide-based silane coupling agent. In addition, Patent Literature 2 suggests a silane compound having an amino group as a reactive functional group and a methoxy group as a hydrolyzable group.

Further, Patent Literature 3 suggests a rubber composition in which an organic silane compound having a monosulfide bond is compounded to improve scorch resistance of a rubber composition and exothermic properties (viscoelastic properties) of a rubber composition crosslinked product.

To solve the problem that impurities contained in natural rubber inhibit the reaction of a silane coupling agent, Patent Literature 4 discloses a rubber composition in which silica having a particular specific surface area and a specific glycerin monofatty acid ester are compounded in specific amounts. Patent Literature 5 discloses a tire rubber composition for which a modified natural rubber obtained by enzymatic treatment with a proteolytic enzyme followed by further enzymatic treatment with a lipolytic enzyme and/or a phospholipid-degrading is used. Further, Patent Literature 6 discloses a method for producing deproteinized natural rubber latex characterized by adding a protein denaturant selected from the group consisting of urea-based compounds and NaClO to natural rubber latex and removing the protein denaturant after denaturing the proteins in the latex. Furthermore, Patent Literature 7 discloses a method for producing modified natural rubber in which by adding a urea-based compound, proteins are released from rubber particles in natural rubber latex and dried such that the proteins are contained in the modified natural rubber.

CITATION LIST

Patent Literature

Patent Literature 1: Japanese Unexamined Patent Publication H8-259736 (1996)
Patent Literature 2: Japanese Unexamined Patent Publication H11-335381 (1996)
Patent Literature 3: Japanese Unexamined Patent Publication No. 2014-177432
Patent Literature 4: Japanese Unexamined Patent Publication No. 2016-113515
Patent Literature 5: Japanese Unexamined Patent Publication No. 2016-74844
Patent Literature 6: Japanese Unexamined Patent Publication No. 2004-99696
Patent Literature 7: Japanese Unexamined Patent Publication No. 2010-111722

SUMMARY OF THE INVENTION

Technical Problem

However, the reactive functional group of the silane compound suggested in Patent Literature 1 and 2 has a high polarity, and therefore in a case in which an organic polymer material to be mixed has a low polarity, there was a tendency that affinity between the silane compound and the organic polymer material is low, causing poor dispersion and poor mixing to occur. For such a reason, in a case in which a silane coupling agent composition comprising such a silane compound was contained in a rubber composition, there was a tendency that viscoelastic properties of the crosslinked product of a rubber composition obtained by molding this rubber composition cannot be sufficiently improved. Meanwhile, in a case in which a conventional silane compound having a low-polar reactive functional group was added in order to increase affinity with a low-polarity organic polymer material, its reactivity with an organic polymer material was low, and its performance as a silane coupling agent was insufficient.

In addition, the silane compound described in Patent Literature 3 does not have appropriate reactivity with organic polymer materials.

The rubber composition in which silica having a particular specific surface area and a specific glycerin monofatty acid ester are compounded in specific amounts described in Patent Literature 4 had room for further improvement in tensile properties such as modulus. In addition, there was a concern that the tire rubber composition for which a modified natural rubber obtained by enzymatic treatment with a proteolytic enzyme followed by enzymatic treatment with a lipolytic enzyme and/or a phospholipid-degrading is used described in Patent Literature 5 would complicate the process and cause an increase in cost.

Further, although a protein denaturant is used in Patent Literature 6, it is a technology related to the production of liquid natural rubber latex. Patent Literature 6 does not describe natural rubber in the form of dry rubber. In addition, no specific silane coupling agent is described. Patent Literature 7 relates to the production of solid natural rubber using special equipment after adding a protein denaturant to natural rubber latex but does not describe a specific silane coupling agent.

The present inventors found a problem that impurities in natural rubber (e.g., proteins and phospholipids) inhibit the coupling reaction, which causes poor mixing and poor dispersion of organic polymer materials, including natural rubber and inorganic materials such as silica. As a result of intensive studies in order to obtain means for solving such a problem, the present inventors found that when a silane compound having a specific structure and functioning by itself as a coupling agent and a protein denaturant are compounded into a rubber composition containing diene-based rubber (especially natural rubber or synthetic isoprene rubber) or the like, a coupling reaction is promoted, and as a result, the dispersibility of an inorganic material such as silica is improved, and thus, the viscoelastic properties of a rubber product or the like obtained from the rubber composition or the like are improved. The present inventors also found that when the above-described silane compound and a silanization reaction accelerator are compounded into a rubber composition containing a diene-based rubber (especially natural rubber or synthetic isoprene rubber) or the like, a coupling reaction is promoted, and as a result, the dispersibility of an inorganic material such as silica is improved, and thus, the viscoelastic properties of a rubber product or the like obtained from the rubber composition or the like are improved. The present invention is based on these findings.

Therefore, it is an object of the present invention to provide a silane coupling agent composition with which it is possible to obtain a rubber composition having excellent scorch resistance while having appropriate reactivity with an organic polymer material such as rubber and a crosslinked product of a rubber composition having excellent viscoelastic properties. It is another object of the present invention to provide a rubber composition having excellent scorch resistance, a crosslinked product of a rubber composition having excellent viscoelastic properties, and a tire using the same which has an excellent balance of wet grip performance and low-fuel consumption.

Solution to Problem

As a result of intensive studies, the present inventors found that by using, as silane coupling agents, two alicyclic silane compounds having affinity and moderate reactivity with organic polymer materials, having an alicyclic hydrocarbon moiety with an olefinic structure, and having a silyl group, a coupling reaction is promoted, and as a result, in a case in which a material to be compounded is a rubber composition, the dispersibility of an inorganic material such as silica is improved, and thus, the viscoelastic properties of a crosslinked product (rubber product) or the like obtained from the rubber composition or the like are improved. The present invention is based on these findings.

The present invention encompasses the following inventions.

[1] A silane coupling agent composition comprising a silane compound, a protein denaturant, and/or a silanization reaction accelerator,
wherein the silane compound comprises a first silane compound represented by the following Formula (1):

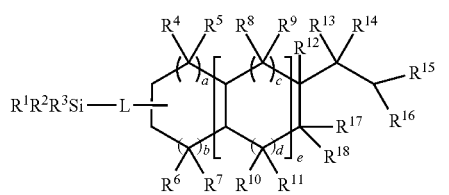

(1)

wherein
$R^1$, $R^2$, and $R^3$ each independently represent a hydrocarbon group optionally containing an oxygen atom or a nitrogen atom, or a hydrogen atom;
L is a hydrocarbon group optionally containing at least one heteroatom selected from the group consisting of nitrogen, oxygen, and sulfur;
a is an integer of 0 or 1;
b is an integer of 0 or 1;
c is independently an integer of 0 or 1;
d is independently an integer of 0 or 1;
e is an integer of 0 to 5;
$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
f is an integer of 1 to 5;
$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
g is an integer of 1 to 5; and
$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;
or
$R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms, and
a second silane compound represented by the following Formula (11):

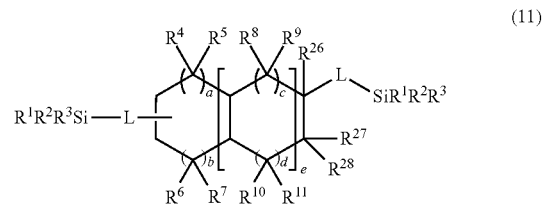

(11)

wherein
$R^1$, $R^2$, and $R^3$ each independently represent a hydrocarbon group optionally containing an oxygen atom or a nitrogen atom, or a hydrogen atom;
L is independently a hydrocarbon group optionally containing at least one heteroatom selected from the group consisting of nitrogen, oxygen, and sulfur;
a is an integer of 0 or 1;
b is an integer of 0 or 1;
c is independently an integer of 0 or 1;
d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{26}$, $R^{27}$, and $R^{28}$ each independently represent a hydrogen atom, a methyl group, or an alkyl group having 2 to 10 carbon atoms.

[2] The silane coupling agent composition according to [1], wherein the first silane compound is a compound represented by the following Formula (2):

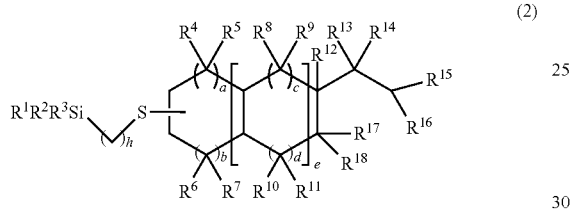

(2)

wherein $R^1$, $R^2$, and $R^3$ each independently represent a hydrocarbon group optionally containing an oxygen atom or a nitrogen atom, or a hydrogen atom, h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

[3] The silane coupling agent composition according to [1] or [2], wherein the second silane compound is a compound represented by the following Formula (12):

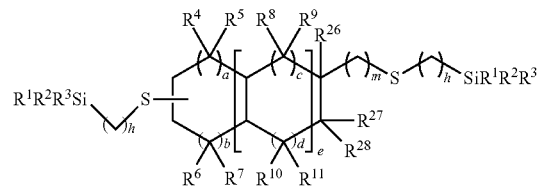

(12)

wherein $R^1$, $R^2$, and $R^3$ each independently represent a hydrocarbon group optionally containing an oxygen atom or a nitrogen atom, or a hydrogen atom;

h is an integer of 1 to 10;

m is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{26}$, $R^{27}$, and $R^{28}$ each independently represent a hydrogen atom, a methyl group, or an alkyl group having 2 to 10 carbon atoms.

[4] The silane coupling agent composition according to any one of [1] to [3], wherein a content of the second silane compound is from 1% to 50% by mass with respect to a total content of the first silane compound and the second silane compound.

[5] The silane coupling agent composition according to any one of [1] to [4], wherein the silane compound further comprises a different silane compound other than first silane compound and the second silane compound.

[6] The silane coupling agent composition according to [5], wherein the different silane compound is a silane compound represented by the Formula (13):

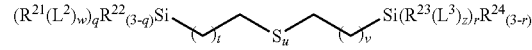

(13)

wherein
t and v are each independently an integer of 0 to 10;
u is an integer of 2 to 10;
q and r are each independently an integer of 1 to 3;
w and z are each independently an integer of 0 or 1,
$L^2$ and $L^3$ are each independently a hydrocarbon group optionally containing at least one heteroatom selected from the group consisting of nitrogen, oxygen, and sulfur;
$R^{21}$ and $R^{23}$ are each independently an alkoxy group or an amino group substituted with one or more alkyl groups; and
$R^{22}$ and $R^{24}$ are each independently hydrogen or an alkyl group.

[7] The silane coupling agent composition according to any one of [1] to [6], wherein the protein denaturant is at least one selected from the group consisting of a carbamide compound, a guanidine compound, and a surfactant.

[8] The silane coupling agent composition according to any one of [1] to [6], wherein the silanization reaction accelerator is at least one selected from the group consisting of a carbamide compound and a guanidine compound.

[9] The silane coupling agent composition according to [7] or [8], wherein the carbamide compound is urea.

[10] The silane coupling agent composition according to [7] or [8], wherein the guanidine compound is diphenylguanidine.

[11] The silane coupling agent composition according to any one of [1] to [10], which further comprises carbon black.

[12] The silane coupling agent composition according to any one of [1] to [11], which is used for a natural rubber and/or a synthetic isoprene rubber.

[13] A rubber composition comprising the silane coupling agent composition according to any one of [1] to [12], a diene-based rubber, and silica, wherein
the diene-based rubber comprises at least a natural rubber and/or a synthetic isoprene rubber, and
a total content of the first silane compound and the second silane compound is from 0.5 to 30 parts by mass with respect to 100 parts by mass of the silica.

[14] The rubber composition according to [13], wherein a content of the silica is from 0.5 to 300 parts by mass with respect to 100 parts by mass of the diene-based rubber.

[15] The rubber composition according to [13] or [14], which is used for a tire.

[16] A crosslinked product of the rubber composition according to any one of [13] to [15].

[17] A pneumatic tire in which the crosslinked product according to [16] is used for a tire tread.

Advantageous Effects of Invention

According to the present invention, a silane coupling agent composition, with which it is possible to obtain a rubber composition having excellent scorch resistance while having appropriate reactivity with an organic polymer material such as rubber and a crosslinked product of a rubber composition having excellent viscoelastic properties, can be provided. Further, according to the present invention, a rubber composition having excellent scorch resistance, a crosslinked product of a rubber composition having excellent viscoelastic properties, and a tire using the same, which has an excellent balance of wet grip performance and low-fuel consumption can be provided.

DETAILED DESCRIPTION OF THE INVENTION

Definition

Figure 1:
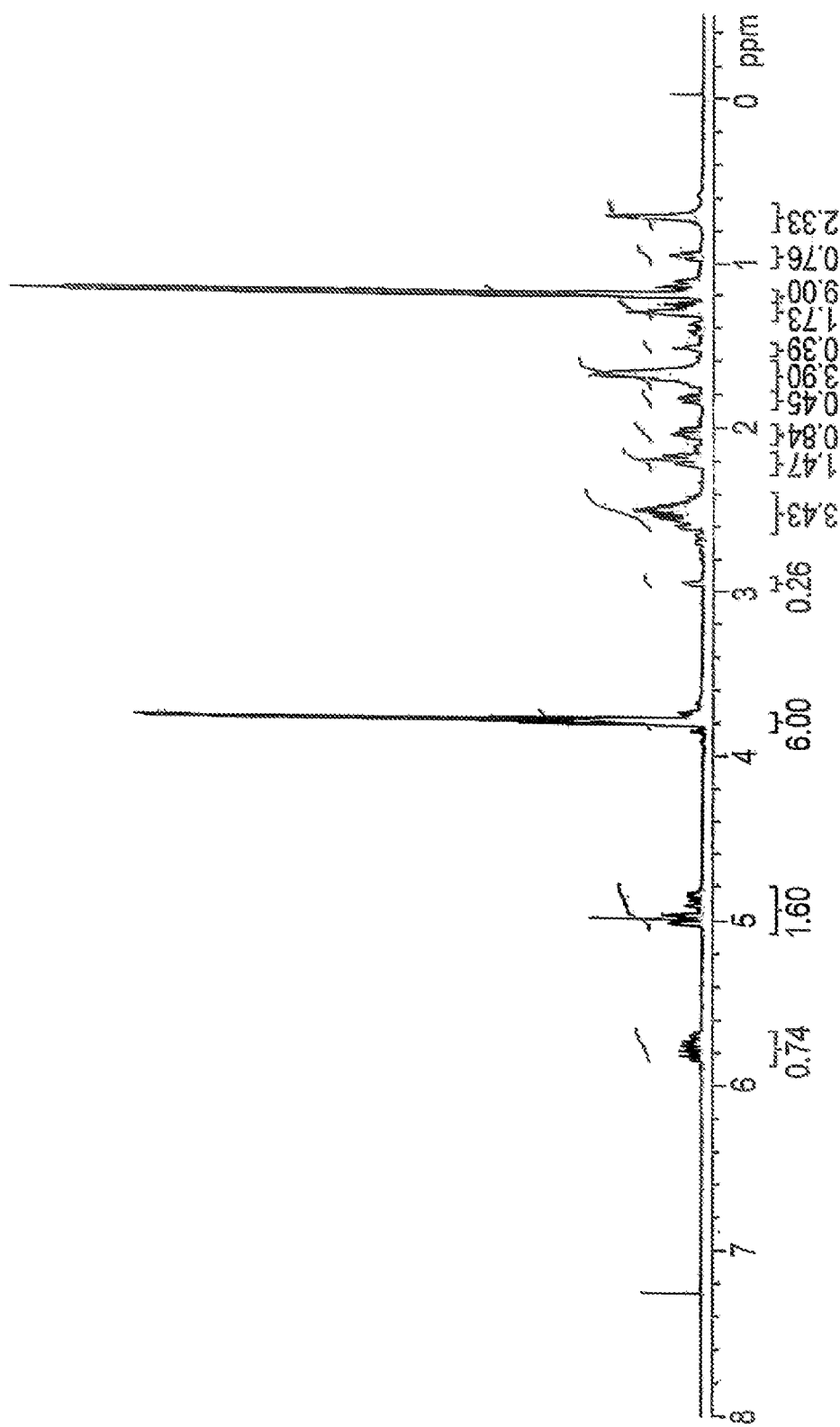
FIG. 1 is a $^1$H-NMR chart of silane compound 1 synthesized in Preparation Example 1.

The terms "part(s)," "%," and the like indicating compounding amounts used herein are based on mass unless otherwise specified.

Silane Coupling Agent Composition

The silane coupling agent composition of the present invention is characterized by comprising a first silane compound, a second silane compound, and a protein denaturant and/or a silanization reaction accelerator. With the silane coupling agent composition of the present invention, it is possible to obtain a rubber composition having excellent scorch resistance while having appropriate reactivity with an organic polymer material such as rubber and a crosslinked product of a rubber composition having excellent viscoelastic properties.

The total content of a first silane compound and a second silane compound in the silane coupling agent composition is preferably from 20% to 99% by mass, more preferably from 50% to 95% by mass, and still more preferably from 60% to 90% by mass with respect to the total mass of the silane coupling agent composition. In addition, the total content of a protein denaturant and a silanization reaction accelerator in the silane coupling agent composition is preferably from 0.1% to 50% by mass, more preferably from 1% to 45% by mass, and still more preferably 5% to 40% by mass with respect to the total mass of the silane coupling agent composition.

The content of a second silane compound in the silane coupling agent composition is preferably from 1% to 50% by mass, more preferably from 2% to 40% by mass, and still more preferably from 5% to 30% by mass with respect to the total content of a first silane compound and a second silane compound. As long as the proportion of the content of a second silane compound in the silane coupling agent composition is within the above-described numerical range, a rubber composition having excellent scorch resistance while having appropriate reactivity with an organic polymer material such as rubber and a crosslinked product of a rubber composition having excellent viscoelastic properties can be easily obtained.

The silane coupling agent composition may further comprise carbon black. As the carbon black, carbon black described in inorganic materials described below can be used. Each component of the silane coupling agent composition will be described in detail below.

(First Silane Compound)

The first silane compound contained in the silane coupling agent composition of the present invention is a compound represented by the following Formula (1):

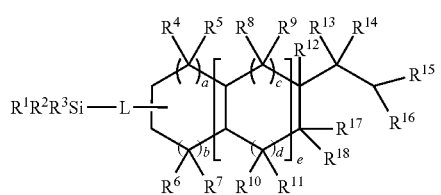

wherein
- $R^1$, $R^2$, and $R^3$ each independently represent a hydrocarbon group optionally containing an oxygen atom or a nitrogen atom, or a hydrogen atom;
- L is a hydrocarbon group optionally containing at least one heteroatom selected from the group consisting of nitrogen, oxygen, and sulfur;
- a is an integer of 0 or 1;
- b is an integer of 0 or 1;
- c is independently an integer of 0 or 1;
- d is independently an integer of 0 or 1;
- e is an integer of 0 to 5;
- $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by —$(CH_2)_f$—;
- f is an integer of 1 to 5;
- $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by —$(CH_2)_g$—;
- g is an integer of 1 to 5;
- $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;
- or
- $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

In Formula (1) above, a is an integer of 0 or 1, preferably 1;
- b is an integer of 0 or 1, preferably 1;
- c is independently an integer of 0 or 1, preferably 1;
- d is independently an integer of 0 or 1, preferably 1;
- e is an integer of 0 to 5, preferably an integer of 0 to 3, more preferably an integer of 0 to 2, and still more preferably an integer of 0 or 1;
- $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by —$(CH_2)_f$—;
- f is an integer of 1 to 5, preferably an integer of 1 to 4, more preferably an integer of 1 to 3, and still more preferably 1;
- $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by —$(CH_2)_g$—;
- g is an integer of 1 to 5, preferably an integer of 1 to 4, more preferably an integer of 1 to 3, and still more preferably 1;
- $R^{16}$ is a hydrogen atom, a methyl group, or an alkyl group having 2 to 8 carbon atoms, preferably a hydrogen atom, a methyl group, or an alkyl group having 2 or 3 carbon atoms, more preferably a hydrogen atom or a methyl group, and still more preferably a hydrogen atom, while $R^{17}$ is a hydrogen atom, a methyl group, or an alkyl group having 2 to 10 carbon atoms, preferably a hydrogen atom, a methyl group, or an alkyl group having 2 to 5 carbon atoms, more preferably a hydrogen atom or a methyl group, and still more preferably a hydrogen atom, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;
- or
- $R^{16}$ and $R^{17}$ optionally combine with each other to form a 4- to 9-membered alicyclic hydrocarbon, preferably a 4- to 7-membered alicyclic hydrocarbon, more preferably a 5- or 6-membered alicyclic hydrocarbon, and still more preferably a 5-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

In Formula (1) above, $R^1$, $R^2$, and $R^3$ each independently represent a hydrocarbon group optionally containing an oxygen atom or a nitrogen atom, or a hydrogen atom. Examples of the hydrocarbon group include an alkyl group, an aralkyl group, and an aryl group.

Examples of the alkyl group include a methyl group, an ethyl group, a propyl group, a butyl group, an isopropyl group, a tert-butyl group, a 2-ethylhexyl group, a cyclopentyl group, and a cyclohexyl group. The number of carbon atoms in the alkyl group is preferably from 1 to 60, more preferably from 1 to 30, and in particular, the alkyl group is preferably a methyl group or an ethyl group.

Examples of the aralkyl group include a benzyl group, a phenethyl group, a naphthylmethyl group, and a biphenylmethyl group. The number of carbon atoms in the aralkyl group is preferably from 7 to 60, more preferably from 7 to 20, and still more preferably from 7 to 14.

Examples of the aryl group include a phenyl group, a biphenyl group, a naphthyl group, a tolyl group, and a xylyl group. The number of carbon atoms in the aryl group is preferably from 6 to 60, more preferably from 6 to 24, and still more preferably from 6 to 12.

A hydrocarbon group containing an oxygen atom or a nitrogen atom is a group having a structure in which a carbon atom in the hydrocarbon group is replaced with an oxygen atom or a nitrogen atom.

In a further preferred embodiment of the present invention, the hydrocarbon group which may contain an oxygen atom or a nitrogen atom for $R^1$, $R^2$, and $R^3$ above is an alkoxy group, an amino group substituted with one or more alkyl groups, or an alkyl group. It is more preferably an alkoxy group having 1 to 30 carbon atoms, more preferably an alkoxy group having 1 to 20 carbon atoms, more preferably an amino group substituted with one or more alkyl groups having 1 to 30 carbon atoms, and still more preferably amino group substituted with one or more alkyl groups having 1 to 20 carbon atoms, or it is more preferably an alkyl group having 1 to 30 carbon atoms and still more preferably an alkyl group having 1 to 20 carbon atoms. Examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. Examples of the alkyl group include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

In Formula (1) above, L is a hydrocarbon group optionally containing at least one heteroatom selected from the group consisting of nitrogen, oxygen, and sulfur. L is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur. Of these, L is a hydrocarbon group containing sulfur. The total length of the linear moiety connecting the silyl group and the alicyclic hydrocarbon moiety in such a hydrocarbon group is preferably from 3 to 8, more preferably from 4 to 7, and still more preferably from 4 to 6 as the total number of atoms of carbon, nitrogen, oxygen, or sulfur.

The first silane compound in the silane coupling agent composition of the present invention is preferably a sulfur-containing silane compound.

The first silane compound contained in the silane coupling agent composition of the present invention is preferably a compound represented by the following Formula (2):

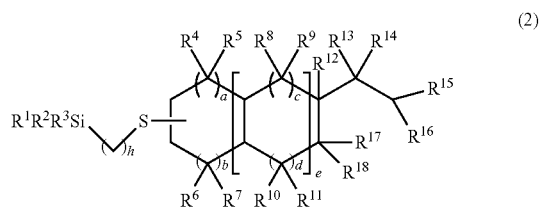

wherein $R^1$, $R^2$, and $R^3$ each independently represent a hydrocarbon group optionally containing an oxygen atom or a nitrogen atom, or a hydrogen atom, h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by —$(CH_2)_f$—;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by —$(CH_2)_g$—;

g is an integer of 1 to 5;

$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

For the compound represented by Formula (2) above, h is an integer of 1 to 10, preferably 1 to 8, more preferably 2 to 7, still more preferably 3 to 6, yet more preferably 3 to 5, and particularly preferably 3. In addition, a to g and $R^1$ to $R^{18}$ are as explained in Formula (1) above.

The first silane compound contained in the silane coupling agent composition of the present invention is more preferably a compound represented by the following Formula (3):

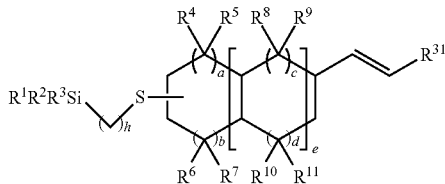

wherein
  $R^1$, $R^2$, and $R^3$ each independently represent a hydrocarbon group optionally containing an oxygen atom or a nitrogen atom, or a hydrogen atom,
  h is an integer of 1 to 10;
  a is an integer of 0 or 1;
  b is an integer of 0 or 1;
  c is independently an integer of 0 or 1;
  d is independently an integer of 0 or 1;
  e is an integer of 0 to 5;
  $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
  f is an integer of 1 to 5;
  $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
  g is an integer of 1 to 5; and
  $R^{31}$ is a hydrogen atom, a methyl group, or an alkyl group having 2 to 8 carbon atoms.

For the compound represented by Formula (3) above, a to g and $R^1$ to $R^{11}$ are as explained in Formula (1) above, and h is explained in Formula (2) above.

$R^{31}$ in Formula (3) is a hydrogen atom, a methyl group, or an alkyl group having 2 to 8 carbon atoms, preferably a hydrogen atom, a methyl group, or an alkyl group having 2 to 5 carbon atoms, more preferably a hydrogen atom, a methyl group, or an alkyl group having 1 or 2 carbon atoms, and still more preferably a hydrogen atom.

The first silane compound contained in the silane coupling agent composition of the present invention is more preferably a compound represented by the following Formula (4):

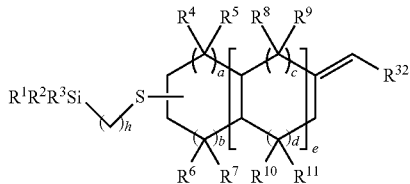

wherein
  $R^1$, $R^2$, and $R^3$ each independently represent a hydrocarbon group optionally containing an oxygen atom or a nitrogen atom, or a hydrogen atom;
  h is an integer of 1 to 10;
  a is an integer of 0 or 1;
  b is an integer of 0 or 1;
  c is independently an integer of 0 or 1;
  d is independently an integer of 0 or 1;
  e is an integer of 0 to 5;
  $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
  f is an integer of 1 to 5;
  $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
  g is an integer of 1 to 5; and
  $R^{32}$ is a hydrogen atom, a methyl group, or an alkyl group having 2 to 9 carbon atoms.

For the compound represented by Formula (4) above, a to g and $R^1$ or $R^{11}$ are as explained in Formula (1) above, and h is as explained in Formula (2) above.

$R^{32}$ in Formula (4) is a hydrogen atom, a methyl group, or an alkyl group having 2 to 9 carbon atoms, preferably a methyl group or an alkyl group having 2 to 5 carbon atoms, more preferably a methyl group or an alkyl group having 1 or 2 carbon atoms, and still more preferably a methyl group.

The first silane compound contained in the silane coupling agent composition of the present invention is more preferably a compound represented by the following Formula (5):

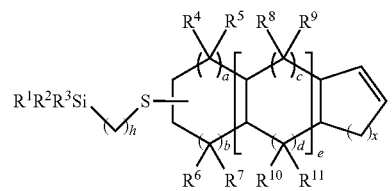

wherein
  $R^1$, $R^2$, and $R^3$ each independently represent a hydrocarbon group optionally containing an oxygen atom or a nitrogen atom, or a hydrogen atom;
  h is an integer of 1 to 10;
  a is an integer of 0 or 1;
  b is an integer of 0 or 1;
  c is independently an integer of 0 or 1;
  d is independently an integer of 0 or 1;
  e is an integer of 0 to 5;
  $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
  f is an integer of 1 to 5;
  $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
  g is an integer of 1 to 5; and
  x is an integer of 0 to 5.

For the compound represented by Formula (5) above, a to g and $R^1$ to $R^{11}$ are as explained in Formula (1) above, and h is as explained in Formula (2) above.

In Formula (5), x is an integer of 0 to 5, preferably an integer of 0 to 3, more preferably 1 or 2, and still more preferably 1.

The first silane compound contained in the silane coupling agent composition of the present invention is still more preferably a compound represented by the following Formula (6):

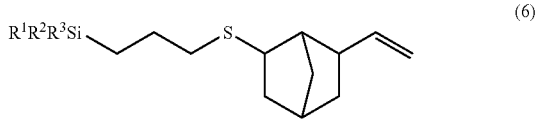
(6)

wherein $R^1$, $R^2$, and $R^3$ each independently represent a hydrocarbon group optionally containing an oxygen atom or a nitrogen atom, or a hydrogen atom; or Formula (7):

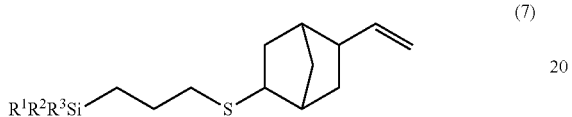
(7)

wherein $R^1$, $R^2$, and $R^3$ each independently represent a hydrocarbon group optionally containing an oxygen atom or a nitrogen atom, or a hydrogen atom; or Formula (8):

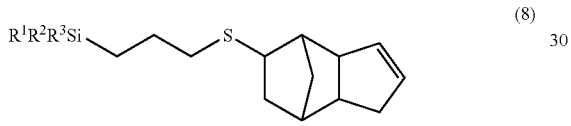
(8)

wherein $R^1$, $R^2$, and $R^3$ each independently represent a hydrocarbon group optionally containing an oxygen atom or a nitrogen atom, or a hydrogen atom; or Formula (9):

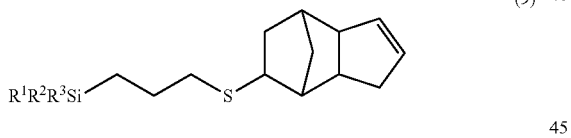
(9)

wherein $R^1$, $R^2$, and $R^3$ each independently represent a hydrocarbon group optionally containing an oxygen atom or a nitrogen atom, or a hydrogen atom.

For the compounds represented by Formulas (6) to (9) above, $R^1$ to $R^3$ are as explained in Formula (1) above.

Another further preferred embodiment of the first silane compound in the silane coupling agent composition of the present invention can be compounds represented by the following formulas. For the compounds represented by the following formulas, $R^1$ to $R^3$ are as explained in Formula (1) above.

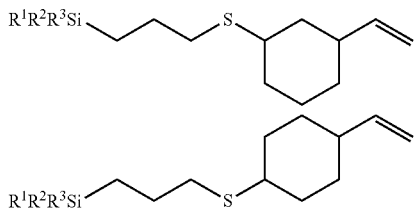

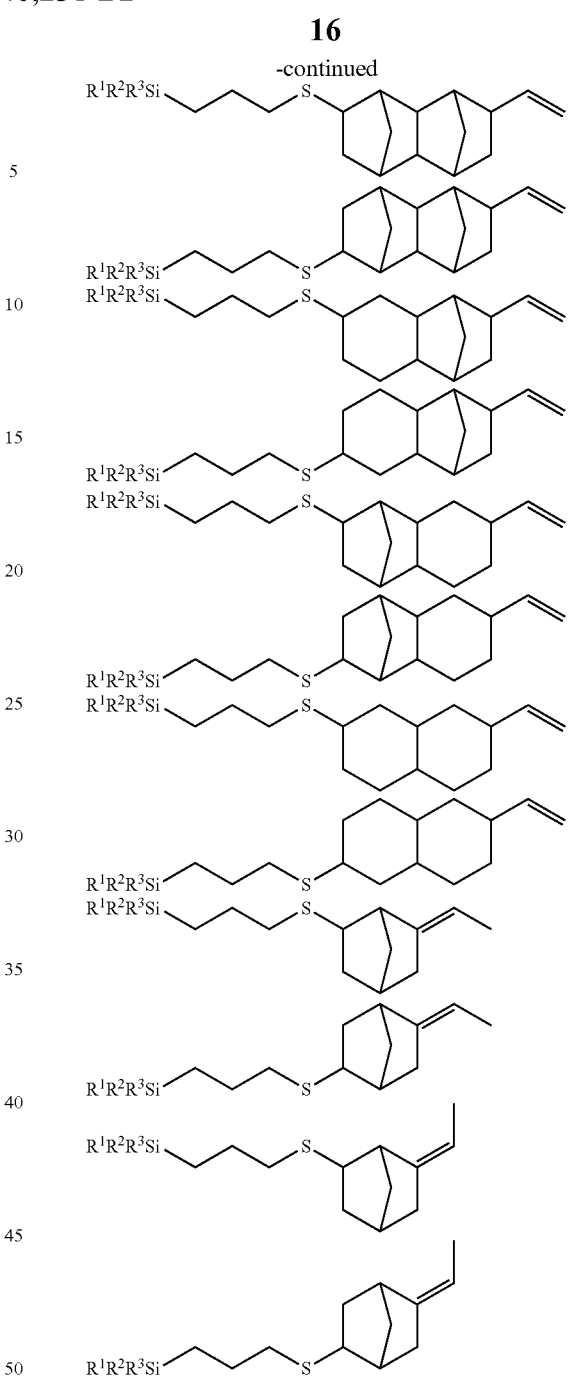

wherein $R^1$, $R^2$, and $R^3$ each independently represent a hydrocarbon group optionally containing an oxygen atom or a nitrogen atom, or a hydrogen atom.

A still more preferred embodiment of the first silane compound contained in the silane coupling agent composition of the present invention can be a silane compound in which the $R^1R^2R^3Si$ group in Formulas (1) to (9) above has a chemical structure of the following Formula (10):

(10)

wherein
R$^{19}$ is each independently an alkoxy group or an amino group substituted with one or more alkyl groups;
R$^{20}$ is each independently hydrogen or an alkyl group,
L$^{1}$ is each independently a hydrocarbon group optionally containing at least one heteroatom selected from the group consisting of nitrogen, oxygen, and sulfur;
j is independently an integer of 0 or 1;
k is an integer of 1 to 3; and
an asterisk (*) indicates a site bound to a moiety other than the silyl group of the silane compound.

In Formula (10) above, R$^{19}$ is each independently an alkoxy group or an amino group substituted with one or more alkyl groups. In one preferred embodiment, R$^{19}$ is each independently a hydrolyzable group, which is an alkoxy group, more preferably an alkoxy group having 1 to 30 carbon atoms, and still more preferably an alkoxy group having 1 to 20 carbon atoms, or an amino group substituted with one or more alkyl groups, more preferably an amino group substituted with one or more alkyl groups having 1 to 30 carbon atoms, and still more preferably amino group substituted with one or more alkyl groups having 1 to 20 carbon atoms. Specific examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. An alkoxy group and an amino group may be bound to silicon (Si) via a linking group consisting of a hydrocarbon group optionally containing at least one heteroatom selected from the group consisting of nitrogen, oxygen, and sulfur.

R$^{20}$ is each independently a hydrogen atom or an alkyl group, more preferably an alkyl group having 1 to 30 carbon atoms, and still more preferably an alkyl group having 1 to 20 carbon atoms. Specific examples thereof include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

In Formula (10) above, L$^{1}$ is each independently a hydrocarbon group optionally containing at least one heteroatom selected from the group consisting of nitrogen, oxygen, and sulfur. L$^{1}$ is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur.

In Formula (10) above, k is an integer of 1-3, preferably an integer of 2-3 and more preferably 3.

In addition, j is independently an integer of 0 or 1, preferably 0.

The first silane compound contained in the silane coupling agent composition of the present invention is further preferably a silane compound in which the R$^{1}$R$^{2}$R$^{3}$Si group is a triethoxysilyl group or a trimethoxysilyl group in Formulas (1) to (9) above, and still further preferably a silane compound in which the R$^{1}$R$^{2}$R$^{3}$Si group is a triethoxysilyl group in Formulas (1) to (9) above A particularly preferred embodiment of the first silane compound contained in the silane coupling agent composition of the present invention can be compounds represented by the following formulas.

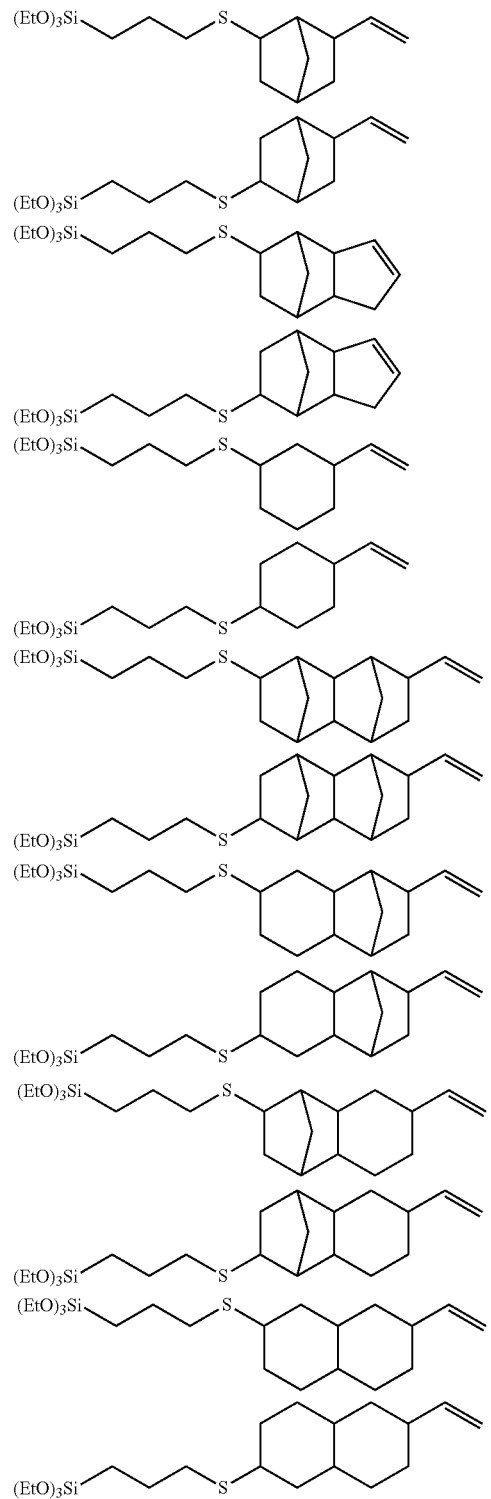

-continued

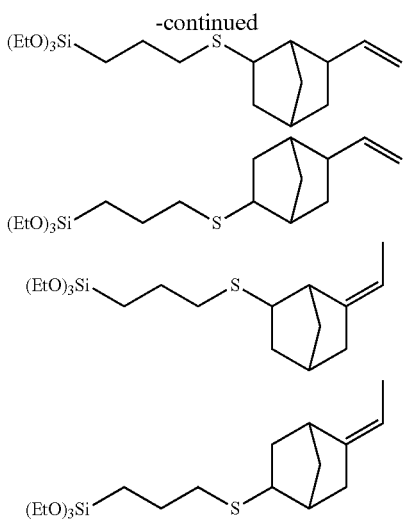

The first silane compound of the present invention is preferably its stereoisomer or any mixture of those stereoisomers.

(Method for Producing First Silane Compound)

One embodiment of the method for producing the first silane compound represented by Formula (1) contained in the silane coupling agent composition of the present invention will be explained but is not limited to the following production method. For example, the first silane compound can be produced by reacting a compound represented by Formula (14):

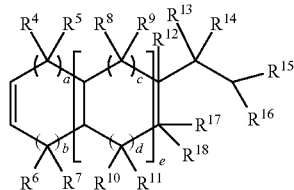
(14)

wherein
a is an integer of 0 or 1;
b is an integer of 0 or 1;
c is independently an integer of 0 or 1;
d is independently an integer of 0 or 1;
e is an integer of 0 to 5;
$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
f is an integer of 1 to 5;
$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
g is an integer of 1 to 5; and
$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms; and a compound represented by Formula (15):

$$R^1R^2R^3Si-Y \qquad (15)$$

wherein
$R^1$, $R^2$, and $R^3$ each independently represent a hydrocarbon group optionally containing an oxygen atom or a nitrogen atom, or a hydrogen atom,
Y is a hydrocarbon group optionally containing at least one heteroatom selected from the group consisting of nitrogen, oxygen, and sulfur.

In Formulas (14) and (15) above, $R^1$ to $R^{18}$ and a to g are as explained for the first silane compound represented by Formula (1).

In Formula (15) above, Y is a hydrocarbon group optionally containing at least one heteroatom selected from the group consisting of nitrogen, oxygen, and sulfur. Y is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur. Of these, Y is a hydrocarbon group containing sulfur. The total length of the linear moiety connecting the silyl group and the site bound to the alicyclic hydrocarbon moiety in such a hydrocarbon group is preferably from 3 to 8, more preferably from 4 to 7, and still more preferably from 4 to 6 as the total number of atoms of carbon, nitrogen, oxygen, or sulfur.

In producing the first silane compound represented by Formula (1), the silane compound can be synthesized by subjecting the compound represented by Formula (14) and the compound represented by Formula (15) to an addition reaction or condensation reaction. As the addition reaction used herein, a radical addition reaction, a conjugate addition reaction, a nucleophilic addition reaction, an electrophilic addition reaction, and the like can be used. For example, a pericyclic reaction, a hydrosilylation reaction, a hydroamination reaction, and the like can be used. As the condensation reaction, for example, an esterification reaction, an amidation reaction, a thioesterification reaction, a thioamidation reaction, a Friedel-Crafts reaction, and the like can be used.

The compound represented by Formula (14) above can be synthesized by a Diels-Alder reaction between identical or different conjugated dienes or a Diels-Alder reaction of conjugated dienes and alkenes based on the knowledge already known to those skilled in the art. The compound represented by Formula (14) can be prepared by thermally denaturing and/or purifying the compound synthesized by the Diels-Alder reaction as necessary.

The first silane compound represented by Formula (2) contained in the silane coupling agent composition of the present invention can be produced by reacting a compound represented by Formula (14) above and a compound represented by the following Formula (16):

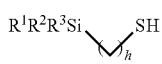 (16)

wherein
R$^1$, R$^2$, and R$^3$ each independently represent a hydrocarbon group optionally containing an oxygen atom or a nitrogen atom, or a hydrogen atom,
h is an integer of 1 to 10.

In Formulas (14) and (16) above, R$^1$ to R$^{18}$ and a to g are as explained for the first silane compound represented by Formula (1). Further, h is explained for the compound represented by Formula (2).

Here, it is considered that the compound represented by Formula (2) above is synthesized by mixing and heating the compound represented by Formula (14) above and the compound represented by Formula (16) above such that the mercapto group in the compound represented by Formula (16) reacts with the carbon-carbon unsaturated bond moiety in the compound represented by Formula (14). The compound represented by Formula (16) above is mixed preferably in an amount of from 0.1 to 4 mol and more preferably in an amount of from 0.2 to 3 mol with respect to 1 mol of the compound represented by Formula (14) above. The heating temperature is preferably from 40° C. to 300° C. and more preferably from 50° C. to 200° C.

Examples of the compound represented by Formula (16) above include an alkoxysilane compound having a mercapto group. Examples of the alkoxysilane compound having a mercapto group include mercaptotrimethoxysilane, mercaptotriethoxysilane, mercaptomethyl trimethoxysilane, mercaptomethyl triethoxysilane, mercaptomethyl tripropoxysilane, 2-mercaptoethyl trimethoxysilane, 2-mercaptoethyl triethoxysilane, 3-mercaptopropyl trimethoxysilane, 4-mercaptobutyl trimethoxysilane, 3-mercaptopropyl triethoxysilane, 4-mercaptobutyl triethoxysilane, 2-mercaptoethyl tripropoxysilane, 3-mercaptopropyl tripropoxysilane, 4-mercaptobutyl tripropoxysilane, 2-mercaptoethyl methyldimethoxysilane, 3-mercaptopropyl methyldimethoxysilane, 4-mercaptobutyl methyldimethoxysilane, 2-mercaptoethyl methyldiethoxysilane, 3-mercaptopropyl methyldiethoxysilane, and 4-mercaptobutyl methyldiethoxysilane.

In addition, the compound represented by Formula (2) above can also be synthesized by mixing and heating the compound represented by Formula (14) above and the compound represented by Formula (13) described later. It is considered that the polysulfide bond in the compound represented by Formula (13) is cleaved, and this reacts with the carbon-carbon unsaturated bond moiety in the compound represented by Formula (14) such that the compound represented by Formula (2) is synthesized. The compound represented by Formula (13) is mixed preferably in an amount of from 0.1 to 4 mol and more preferably in an amount of from 0.3 to 3 mol with respect to 1 mol of the compound represented by Formula (14). The heating temperature is preferably from 40° C. to 300° C. and more preferably from 50° C. to 200° C.

A radical initiator can also be used together as necessary. Examples of the radical initiator that can be used include: azo compounds such as azobisisobutyronitrile (AIBN) and 1,1'-azobis(cyclohexanecarbonitrile) (ABCN); peroxides such as di-tert-butyl peroxide (t-BuOOBu-t) or tert-butyl hydroperoxide (t-BuOOH), benzoyl peroxide (BPO, PhC(=O)OOC(=O)pH), methyl ethyl ketone peroxide, and dicumyl peroxide (DCP); dihalogen compounds such as chlorine molecules; redox initiators which are combinations of oxidizing and reducing agents such as a combination of hydrogen peroxide and an iron (II) salt, a combination of persulfate and sodium bisulfite, and the like serving as reagents that can generate radicals at low temperatures; triethyl borane (Et$_3$B); and diethyl zinc (Et$_2$Zn).

Among the compounds represented by Formula (13) described later, bis[3-(triethoxysilyl)propyl]tetrasulfide may be a commercially available product, which is, for example, Si-69 manufactured by Evonik Industries AG. In addition, bis[3-(triethoxysilyl)propyl]disulfide may also be a commercially available product, which is, for example, Si-75 manufactured by Evonik Industries AG.

(Second Silane Compound)

The second silane compound contained in the silane coupling agent composition of the present invention is a compound represented by the following Formula (11):

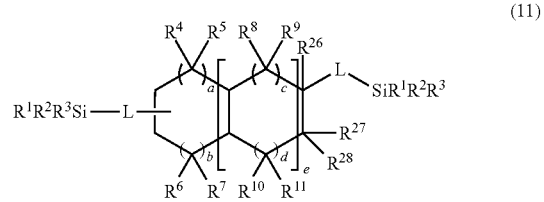 (11)

wherein
R$^1$, R$^2$, and R$^3$ each independently represent a hydrocarbon group optionally containing an oxygen atom or a nitrogen atom, or a hydrogen atom;
L is independently a hydrocarbon group optionally containing at least one heteroatom selected from the group consisting of nitrogen, oxygen, and sulfur;
a is an integer of 0 or 1;
b is an integer of 0 or 1;
c is independently an integer of 0 or 1;
d is independently an integer of 0 or 1;
e is an integer of 0 to 5;
R$^4$, R$^5$, R$^6$, and R$^7$ represent a hydrogen atom, a methyl group, or an alkyl group having 2 to 10 carbon atoms, or one of R$^4$ or R$^5$ and R$^6$ or R$^7$ optionally forms a crosslinked structure represented by —(CH$_2$)$_f$—;
f is an integer of 1 to 5;
R$^8$, R$^9$, R$^{10}$, and R$^{11}$ represent a hydrogen atom, a methyl group, or an alkyl group having 2 to 10 carbon atoms, or one of R$^8$ or R$^9$ and R$^{10}$ or R$^{11}$ optionally forms a crosslinked structure represented by —(CH$_2$)$_g$—;
g is an integer of 1 to 5; and
R$^{26}$, R$^{27}$, and R$^{28}$ each independently represent a hydrogen atom, a methyl group, or an alkyl group having 2 to 10 carbon atoms.

In Formula (11) above, a preferred embodiment of each of R$^1$, R$^2$, R$^3$, R$^4$, R$^5$, R$^6$, R$^7$, R$^8$, R$^9$, R$^{10}$, and R$^{11}$ is explained in Formula (1) above.

A preferred embodiment of each L is explained in Formula (1) above. A preferred embodiment of a, b, c, d, and e is explained in Formula (1) above.

R$^{26}$, R$^{27}$, and R$^{28}$ each independently represent a hydrogen atom, a methyl group, or an alkyl group having 2 to 10 carbon atoms, preferably a hydrogen atom.

The second silane compound in the silane coupling agent composition of the present invention is preferably a sulfur-containing silane compound.

The second silane compound represented by Formula (11) contained in the silane coupling agent composition of the present invention is preferably a compound represented by the following Formula (12):

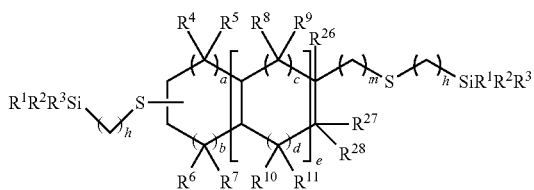

(12)

wherein
R$^1$, R$^2$, and R$^3$ each independently represent a hydrocarbon group optionally containing an oxygen atom or a nitrogen atom, or a hydrogen atom;
h is an integer of 1 to 10;
m is an integer of 1 to 10;
a is an integer of 0 or 1;
b is an integer of 0 or 1;
c is independently an integer of 0 or 1;
d is independently an integer of 0 or 1;
e is an integer of 0 to 5;
R$^4$, R$^5$, R$^6$, and R$^7$ represent a hydrogen atom, a methyl group, or an alkyl group having 2 to 10 carbon atoms, or one of R$^4$ or R$^5$ and R$^6$ or R$^7$ optionally forms a crosslinked structure represented by —(CH$_2$)$_f$—;
f is an integer of 1 to 5;
R$^8$, R$^9$, R$^{10}$, and R$^{11}$ represent a hydrogen atom, a methyl group, or an alkyl group having 2 to 10 carbon atoms, or one of R$^8$ or R$^9$ and R$^{10}$ or R$^{11}$ optionally forms a crosslinked structure represented by —(CH$_2$)$_g$—;
g is an integer of 1 to 5; and
R$^{26}$, R$^{27}$, and R$^{28}$ each independently represent a hydrogen atom, a methyl group, or an alkyl group having 2 to 10 carbon atoms.

In Formula (12) above, a preferred embodiment of each of R$^1$, R$^2$, R$^3$, R$^4$, R$^5$, R$^6$, R$^7$, R$^8$, R$^9$, R$^{10}$, R$^{11}$, R$^{26}$, R$^{27}$, R$^{28}$ is explained in Formula (11) above.

A preferred embodiment of each L is explained in Formula (11) above.

A preferred embodiment of a, b, c, d, and e is explained in Formula (11) above.

A preferred embodiment of h is explained in Formula (2) above.

In Formula (12), m is an integer of 1 to 10, preferably 1 to 8, more preferably 1 to 6, still more preferably 1 to 4, and yet more preferably 1 to 3.

The second silane compound contained in the silane coupling agent composition of the present invention is still more preferably a compound represented by the following Formula (17):

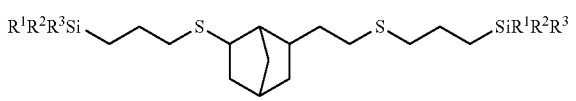

(17)

wherein R$^1$, R$^2$, and R$^3$ each independently represent a hydrocarbon group optionally containing an oxygen atom or a nitrogen atom, or a hydrogen atom, or Formula (18):

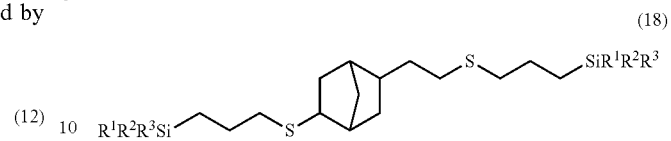

(18)

wherein R$^1$, R$^2$, and R$^3$ each independently represent a hydrocarbon group optionally containing an oxygen atom or a nitrogen atom, or a hydrogen atom.

For the compounds represented by Formulas (17) and (18), R$^1$, R$^2$, and R$^3$ are as explained in Formula (11) above.

Another further preferred embodiment of the second silane compound in the silane coupling agent composition of the present invention can be compounds represented by the following formulas. For the compounds represented by the following formulas, R$^1$ to R$^3$ are as explained in Formula (1) above.

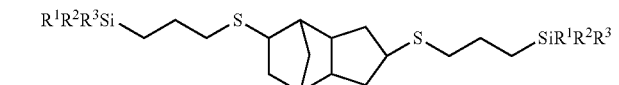
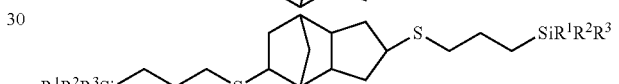
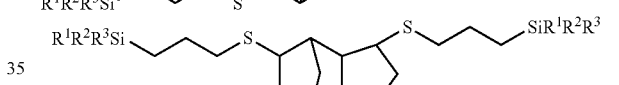
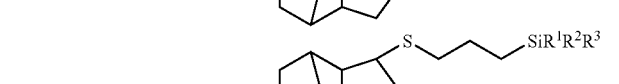
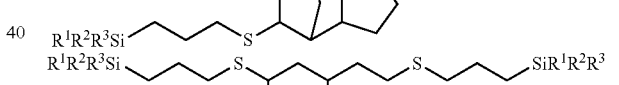
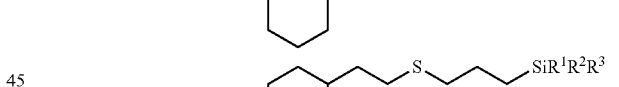
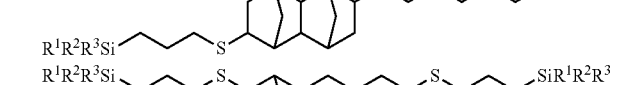
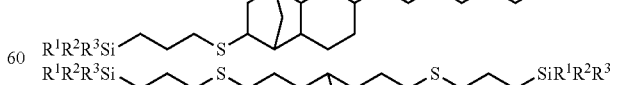
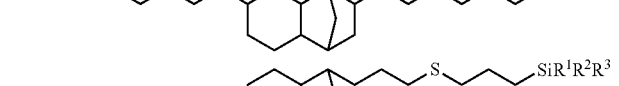

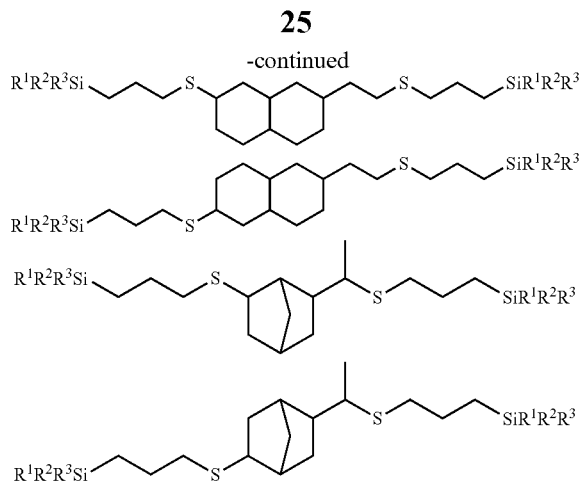

Examples of a still more preferred embodiment of the second silane compound represented by Formula (11) above contained in the silane coupling agent composition of the present invention include a silane compound in which the $R^1R^2R^3Si$ group has the chemical structure of Formula (10). In particular, the second silane compound is further preferably a silane compound in which the $R^1R^2R^3Si$ group is a triethoxysilyl group or a trimethoxysilyl group, and still further preferably a silane compound in which the $R^1R^2R^3Si$ group is a triethoxysilyl group.

A particularly preferred embodiment of the second silane compound contained in the silane coupling agent composition of the present invention can be compounds represented by the following formulas.

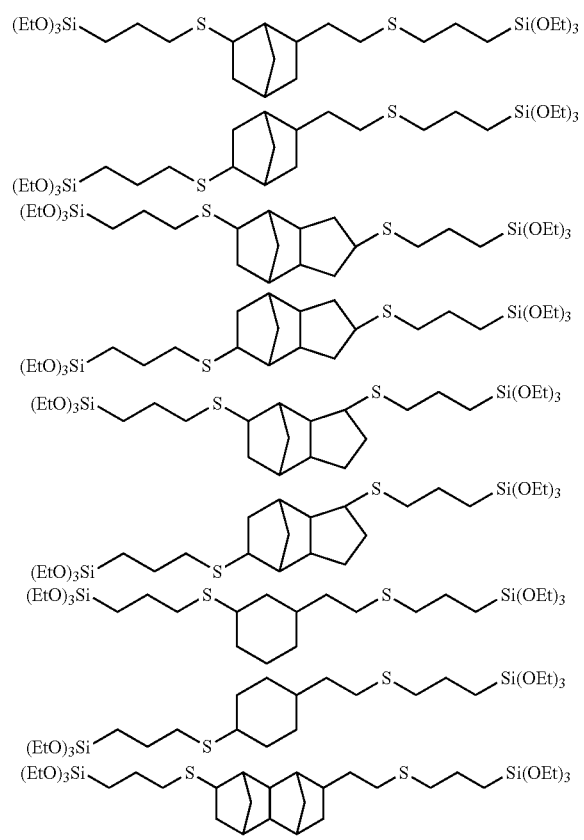

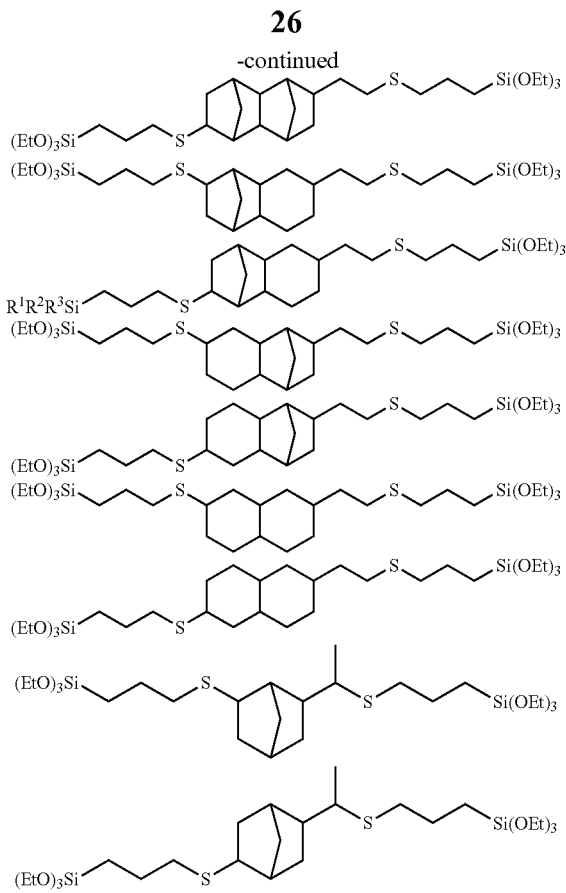

The second silane compound of the present invention is preferably its stereoisomer or any mixture of those stereoisomers.

(Method for Producing Second Silane Compound)

One embodiment of the method for producing the second silane compound represented by Formula (11) contained in the silane coupling agent composition of the present invention will be explained but is not limited to the following production method. For example, the second silane compound can be produced by reacting a compound represented by the following Formula (14):

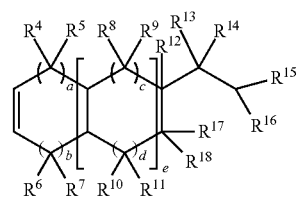

(14)

wherein
a is an integer of 0 or 1;
b is an integer of 0 or 1;
c is independently an integer of 0 or 1;
d is independently an integer of 0 or 1;
e is an integer of 0 to 5;
$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by —$(CH_2)_f$—;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or Ru optionally forms a crosslinked structure represented by —$(CH_2)_g$—;

g is an integer of 1 to 5; and $R^{12}$, $R^{13}$, $R^{14}$, $R^{15}$, $R^{16}$, $R^{17}$, and $R^{18}$ each independently represent a hydrogen atom, a methyl group, or an alkyl group having 2 to 10 carbon atoms, provided that $R^{12}$ and $R^{13}$ combine with each other to form a double bond, or $R^{14}$ and $R^{15}$ combine with each other to form a double bond, and $R^{16}$ and $R^{17}$ optionally combine with each other to form a 4- to 9-membered alicyclic hydrocarbon; and a compound represented by Formula (15) above. Preferred embodiments of Formulas (14) and (15) above are as explained for the first silane compound.

In producing the second silane compound, the silane compound can be synthesized by subjecting the compound represented by Formula (14) above and the compound represented by Formula (15) above to an addition reaction or condensation reaction. As the addition reaction used herein, a radical addition reaction, a conjugate addition reaction, a nucleophilic addition reaction, an electrophilic addition reaction, and the like can be used. For example, a pericyclic reaction, a hydrosilylation reaction, a hydroamination reaction, and the like can be used. As the condensation reaction, for example, an esterification reaction, an amidation reaction, a thioesterification reaction, a thioamidation reaction, a Friedel-Crafts reaction, and the like can be used.

The compound represented by Formula (14) above can be synthesized by a Diels-Alder reaction between identical or different conjugated dienes or a Diels-Alder reaction of conjugated dienes and alkenes based on the knowledge already known to those skilled in the art. The compound represented by Formula (14) above can be prepared by thermally denaturing and/or purifying the compound synthesized by the Diels-Alder reaction as necessary.

The second silane compound can be produced by reacting the compound represented by Formula (14) above with the compound represented by Formula (16) above. A preferred embodiment of Formula (16) above is explained for the first silane compound.

Here, it is considered that the second silane compound is synthesized by mixing and heating the compound represented by Formula (14) above and the compound represented by Formula (16) above such that the mercapto group in the compound represented by Formula (16) reacts with the two carbon-carbon unsaturated bond moieties in the compound represented by Formula (14). The compound represented by Formula (16) above is mixed preferably in an amount of from 0.1 to 4 mol and more preferably in an amount of from 0.3 to 3 mol with respect to 1 mol of the compound represented by Formula (14) above. The heating temperature is preferably from 40° C. to 300° C. and more preferably from 50° C. to 200° C.

In addition, the second silane compound can also be synthesized by mixing and heating the compound represented by Formula (14) above and the compound represented by Formula (13) described later. It is considered that the polysulfide bond in the compound represented by Formula (13) is cleaved, and this reacts with the two carbon-carbon unsaturated bond moieties in the compound represented by Formula (14). The compound represented by Formula (13) is mixed preferably in an amount of from 0.1 to 4 mol and more preferably in an amount of from 0.3 to 3 mol with respect to 1 mol of the compound represented by Formula (14). The heating temperature is preferably from 40° C. to 300° C. and more preferably from 50° C. to 200° C.

A radical initiator can also be used together as necessary. Examples of the radical initiator that can be used include: azo compounds such as azobisisobutyronitrile (AIBN) and 1,1'-azobis(cyclohexanecarbonitrile) (ABCN); peroxides such as di-tert-butyl peroxide (t-BuOOBu-t) or tert-butyl hydroperoxide (t-BuOOH), benzoyl peroxide (BPO, PhC(=O)OOC(=O)pH), methyl ethyl ketone peroxide, and dicumyl peroxide (DCP); dihalogen compounds such as chlorine molecules; redox initiators which are combinations of oxidizing and reducing agents such as a combination of hydrogen peroxide and an iron (II) salt, a combination of persulfate and sodium bisulfite, and the like serving as reagents that can generate radicals at low temperatures; triethyl borane ($Et_3B$); and diethyl zinc ($Et_2Zn$).

Among the compounds represented by Formula (13) described later, bis[3-(triethoxysilyl)propyl]tetrasulfide may be a commercially available product, which is, for example, Si-69 manufactured by Evonik Industries AG. In addition, bis[3-(triethoxysilyl)propyl]disulfide may also be a commercially available product, which is, for example, Si-75 manufactured by Evonik Industries AG.

(Different Silane Compound)

The silane coupling agent composition of the present invention may further comprise a different silane compound other than the first silane compound and the second silane compound (also herein referred to as "different silane compound" in some cases). When a rubber composition comprising the silane coupling agent composition of the present invention is vulcanized by reaction, the different silane compound is also incorporated into the vulcanization reaction, and thus, the first silane compound and the second silane compound, which function as silane coupling agents, react with the different silane compound. It is considered that this reaction creates a synergistic effect that increases the coupling efficiency. The different silane compound in the rubber composition of the present invention is preferably a sulfur-containing silane compound other than the first silane compound and the second silane compound.

As the different silane compound, for example, a compound represented by the following Formula (13) can be used:

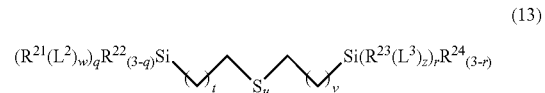

(13)

wherein t and v are each independently an integer of 0 to 10;

u is an integer of 2 to 10;

q and r are each independently an integer of 1 to 3;

w and z are each independently an integer of 0 or 1, $L^2$ and $L^3$ are each independently a hydrocarbon group optionally containing at least one heteroatom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently a hydrogen atom or an alkyl group.

In Formula (13) above, t and v are each independently an integer of 0 to 10, preferably an integer of 0 to 5, more preferably an integer of 1 to 3, and still more preferably 2;

u is an integer of 2 to 10, preferably an integer of 2 to 8;

q and r are each independently an integer of 1 to 3, preferably an integer of 2 to 3 and more preferably 3;

w and z are each independently an integer of 0 or 1, preferably 0.

$L^2$ and $L^3$ are each independently a hydrocarbon group optionally containing at least one heteroatom selected from the group consisting of nitrogen, oxygen, and sulfur; L is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur.

$R^{21}$ and $R^{23}$ are each independently a hydrolyzable group, which is an alkoxy group, more preferably an alkoxy group having 1 to 30 carbon atoms, and still more preferably an alkoxy group having 1 to 20 carbon atoms, or an amino group substituted with one or more alkyl groups, more preferably an amino group substituted with one or more alkyl groups having 1 to 30 carbon atoms, and still more preferably amino group substituted with one or more alkyl groups having 1 to 20 carbon atoms. Specific examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. An alkoxy group and an amino group may be bound to silicon (Si) via a linking group consisting of a hydrocarbon group optionally containing at least one heteroatom selected from the group consisting of nitrogen, oxygen, and sulfur.

$R^{22}$ and $R^{24}$ are each independently a hydrogen atom or an alkyl group, more preferably an alkyl group having 1 to 30 carbon atoms, and still more preferably an alkyl group having 1 to 20 carbon atoms. Specific examples thereof include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

As the different silane compound, in addition to the compound represented by Formula (13) above, the compound represented by Formula (16) above, in particular, silane compounds having structures as shown below, can be used.

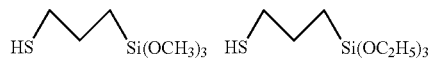

The content of the different silane compound in the silane coupling agent composition of the present invention is preferably from 0.1 to 0.9 and more preferably from 0.2 to 0.8 with respect to the total content of the first silane compound, the second silane compound, and the different silane compound by mass ratio.

(Protein Denaturant)

A protein denaturant known to those skilled in the art can be used as a protein denaturant in the silane coupling agent composition of the present invention. The protein denaturant may be any one that can reduce the stability of protein conformation in the diene-based rubber, in particular, natural rubber. Typical examples of the protein denaturant include: carbamide compounds such as an urea derivative and thiourea; guanidine compounds such as guanidine hydrochloride, guanidinium thiocyanate, guanidine, and diphenylguanidine; surfactants such as sodium dodecyl sulfate; and glutaraldehyde, dimethyl suberimidate dihydrochloride, β-mercaptoethanol, and dithiothreitol. These protein denaturants may be used singly or in combination of two or more thereof. Of these, it is preferable to use a carbamide compound, a guanidine compounds, a surfactant, glutaraldehyde, and dimethyl suberimidate dihydrochloride, and it is more preferable to use an urea derivative, guanidine hydrochloride, diphenylguanidine, sodium dodecyl sulfate, glutaraldehyde, and dimethyl suberimidate dihydrochloride. Examples of the urea derivative include urea, methylurea, ethylurea, propylurea, butylurea, pentylurea, hexylurea, cyclohexylurea, N,N'-dimethylurea, N,N'-diethylurea, N,N,N',N'-tetramethylurea, N,N-dimethyl-N',N'-diphenylurea, diethylurea, dipropylurea, dibutylurea, dipentylurea, dihexylurea, and salts thereof. Of these, urea is excellent. The scorch resistance of the rubber composition can be improved by using a protein denaturant. Further, it is preferable that the silane coupling agent composition of the present invention comprises both a carbamide compound and a guanidine compound.

(Silanization Reaction Accelerator)

A silanization reaction accelerator can be used for the silane coupling agent composition of the present invention. The silanization reaction accelerator may be any one which promotes a silanization reaction between silica and the silane coupling agent. Examples of the silanization reaction accelerator include: carbamide compounds such as an urea derivative and thiourea; and guanidine compounds such as guanidine hydrochloride, guanidinium thiocyanate, guanidine, and diphenylguanidine. These silanization reaction accelerators may be used singly or in combination of two or more thereof. Examples of the urea derivative include urea, methylurea, ethylurea, propylurea, butylurea, pentylurea, hexylurea, cyclohexylurea, N,N'-dimethylurea, N,N'-diethylurea, N,N,N',N'-tetramethylurea, N,N-dimethyl-N',N'-diphenylurea, diethylurea, dipropylurea, dibutylurea, dipentylurea, dihexylurea, and salts thereof. Of these, urea is excellent.

There are two reaction processes in the first-stage reaction of the silanization reaction between silica and a silane coupling agent, which are a direct reaction between the alkoxy group of the silane coupling agent and the silanol group on the silica surface (dealcoholization condensation) and a dehydration condensation reaction between the hydrolyzed alkoxy group of the silane coupling agent and the silanol group on the silica surface. Subsequently, in the second-stage reaction of the silanization reaction, a condensation reaction between adjacent silane coupling agents chemically bound to the silica surface is induced. Here, hydrolysis of the silane coupling agent in the first-stage reaction is a reaction rate limiting factor. However, it is considered that in a case in which a silanization reaction accelerator such as a urea derivative exists, the rate of the hydrolysis reaction increases, thereby promoting the silanization reaction.

According to the present invention, a carbamide compound, a guanidine compound, and the like may exert the functions of both the protein denaturant and the silanization reaction accelerator. For example, in a case in which a silane coupling agent composition containing urea is added to a rubber composition, urea may exert both a protein denaturation effect on natural rubber or the like and an effect of promoting a silanization reaction between silica and a silane coupling agent. In this case, when the urea content is X % by mass with respect to the total mass of the silane coupling agent composition, the above-described "total content of a protein denaturant and a silanization reaction accelerator" is determined to be X % by mass with respect to the total mass of the silane coupling agent composition (i.e., the urea content is not calculated redundantly for both the protein denaturant and the silanization accelerator).

[Rubber Composition]

The rubber composition of the present invention is characterized by comprising the silane coupling agent composition of the present invention, a diene-based rubber, and silica. The rubber composition of the present invention is excellent in scorch resistance and therefore has excellent workability. Further, a crosslinked product having excellent viscoelastic properties can be obtained by using the rubber composition of the present invention. Such rubber composition can be preferably used for tires. Each component of the rubber composition will be described in detail below. The silane coupling agent composition is detailed above.

The total contents of the first silane compound and the second silane compound in the rubber composition is preferably from 0.5 to 30 parts by mass, more preferably from 1 to 20 parts by mass, and still more preferably from 2 to 15 parts by mass with respect to 100 parts by mass of silica. When the total content of the first silane compound and the second silane compound is within the above-described range, viscoelastic properties of the crosslinked product in the rubber composition can be improved, thereby obtaining a tire having an excellent balance of wet grip performance and low-fuel consumption.

The content of the different silane compound in the rubber composition is preferably from 0.01 to 20 parts by mass and more preferably from 0.05 to 10 parts by mass with respect to 100 parts by mass of silica.

The content of a protein denaturant in the rubber composition can vary depending on the type of the protein denaturant, but may be any content as long as the stability of protein conformation decreases. The content of a protein denaturant in the rubber composition is preferably from 0.01 to 10 parts by mass, more preferably from 0.1 to 5 parts by mass, and still more preferably from 0.2 to 3.0 parts by mass with respect to 100 parts by mass of a diene-based rubber. In a case in which two or more protein denaturants are contained, it is desired that the total content thereof is within this numerical range. When the content of a protein denaturant is within the numerical range, the scorch resistance of the rubber composition can be improved. For example, in a case in which a carbamide compound such as urea is used as a protein denaturant, it may be contained at preferably from 0.01 to 10 parts by mass, more preferably from 0.05 to 5 parts by mass, and still more preferably from 0.1 to 3 parts by mass with respect to 100 parts by mass of a diene-based rubber. For example, in a case in which a guanidine compound such as Guanidine hydrochloride is used as a protein denaturant, it may be contained at preferably from 0.01 to 10 parts by mass, more preferably from 0.05 to 5 parts by mass, and still more preferably from 0.1 to 3 parts by mass with respect to 100 parts by mass of a diene-based rubber. In particular, when a guanidine compound is used in combination with a carbamide compound, the viscosity of the uncrosslinked compound of the rubber composition can be reduced, resulting in excellent workability. In such a case, the ratio of the content of a guanidine compound to the content of a carbamide compound (guanidine compound/carbamide compound) is preferably from 0.01 to 3, more preferably from 0.05 to 2, and still more preferably from 0.1 to 1.

The content of a silanization reaction accelerator in the rubber composition can vary depending on the type of the silanization reaction accelerator but may be any content as long as the silanization reaction is promoted. The content of a silanization reaction accelerator in the rubber composition is preferably from 0.01 to 10 parts by mass, more preferably from 0.1 to 5 parts by mass, and still more preferably from 0.2 to 3.0 parts by mass with respect to 100 parts by mass of a diene-based rubber. In a case in which two or more silanization reaction accelerators are contained, it is desired that the total content thereof is within this numerical range. When the content of a silanization reaction accelerator is within the numerical range, the scorch resistance of the rubber composition can be improved. For example, in a case in which a carbamide compound such as urea is used as a silanization reaction accelerator, it may be contained at preferably from 0.01 to 10 parts by mass, more preferably from 0.05 to 5 parts by mass, and still more preferably from 0.1 to 3 parts by mass with respect to 100 parts by mass of a diene-based rubber. For example, in a case in which a guanidine compound such as guanidine hydrochloride is used as a silanization reaction accelerator, it may be contained at preferably from 0.01 to 10 parts by mass, more preferably from 0.05 to 5 parts by mass, and still more preferably from 0.1 to 3 parts by mass with respect to 100 parts by mass of a diene-based rubber. In particular, when a guanidine compound is used in combination with a carbamide compound, it will result in significant effects. In such a case, the ratio of the content of a guanidine compound to the content of a carbamide compound (guanidine compound/carbamide compound) is preferably from 0.01 to 3, more preferably from 0.05 to 2, and still more preferably from 0.1 to 1.

(Diene-Based Rubber)

Examples of a diene-based rubber contained in the rubber composition of the present invention include isoprene-based rubbers and other diene-based rubbers. Examples of isoprene-based rubbers include natural rubber (NR), deproteinized natural rubber, and synthetic isoprene rubber. The deproteinized natural rubber used herein is natural rubber that has been deproteinized. Although the deproteinized natural rubber has a protein content fewer than that of usual natural rubber, it is not completely protein-free. Natural rubber or deproteinized natural rubber contains impurities derived from natural rubber (proteins, phospholipids, and the like). This hinders the coupling reaction of the silane coupling agent, causing a problem that the compounded inorganic material, such as silica, is not sufficiently dispersed in the rubber composition. According to the present invention, in order to solve such a problem, in a case in which a natural rubber and/or a synthetic isoprene rubber is used as a diene-based rubber, the protein denaturant and/or silanization reaction accelerator is added to the silane coupling agent composition. Examples of natural rubbers include natural rubber latex, technically specified rubber (TSR), ribbed smoked sheet (RSS), Gutta Percha, Eucommia-derived natural rubber, guayule-derived natural rubber, Russian dandelion-derived natural rubber, and plant-derived fermented rubber. Examples of natural rubbers also include modified natural rubbers obtained by modifying these natural rubbers such as epoxidized natural rubber, methacrylic acid-modified natural rubber, styrene-modified natural rubber, sulfonic acid-modified natural rubber, and zinc sulfonate-modified natural rubber. The ratio of cis/trans/vinyl in the double bond of natural rubber is not particularly limited, and any ratio can be suitably used. Examples of synthetic isoprene rubbers include copolymers of cis-1,4-isoprene, trans-1,4-isoprene, and 3,4-isoprene (so-called isoprene rubber (IR)). In addition, examples of those having a part of the structure of synthetic isoprene rubber include isoprene-butadiene rubber and halogenated isoprene rubber. According to the present invention, it is preferable to use isoprene rubber (IR) as a diene-based rubber, and it is more preferable to use synthetic isoprene rubber containing 75% or more of the cis-1,4-isoprene structure. The number average molecular weight and molecular weight distribution of the diene-based rubber are not particularly limited, but a number average molecular weight of from 500 to 3,000,000 and a molecular weight distribution of from 1.5 to 15 are preferable.

Examples of other diene-based rubbers include butadiene rubber, styrene-butadiene rubber, styrene-isoprene-butadiene rubber, Styrene-isoprene rubber, partially hydrogenated styrene-butadiene rubber, styrene-α-methylstyrene-butadiene rubber, and ethylene-propylene-diene rubber.

The method for producing diene-based rubber is not particularly limited, and emulsion polymerization, solution polymerization, radical polymerization, anionic polymerization, cationic polymerization, and the like can be exemplified. In addition, the glass transition temperature is not particularly limited.

The content of diene-based rubber is preferably from 20% to 80% by mass, more preferably from 25% to 75% by mass, and still more preferably from 30% to 70% by mass with respect to the total solid mass of the rubber composition.

(Inorganic Material)

Examples of an inorganic material contained in the rubber composition of the present invention include silica, carbon black, calcium carbonate, titanium oxide, clay, and talc, which can be used singly or in combination. Of these, at least silica is used in the present invention because mechanical properties and heat resistance can be further improved. The content of the inorganic material is preferably from 0.1 to 500 parts by mass and more preferably from 1 to 300 parts by mass with respect to 100 parts by mass of the diene-based rubber.

Silica is not particularly limited, but for example, dry-process silica, wet-process silica, colloidal silica, and precipitated silica can be exemplified. Of these, wet-process silica containing hydrous silicic acid as the main component is preferable. These silicas may be used singly or in a combination of two or more thereof. The specific surface area of silica as described above is not particularly limited; however, improvements in reinforcing properties, wear resistance, exothermic properties, and the like are sufficiently achieved when the nitrogen adsorption-specific surface area (BET method) is in a range of usually from 10 to 400 $m^2/g$, preferably from 20 to 300 $m^2/g$ and more preferably from 120 to 190 $m^2/g$, which is preferable. The nitrogen adsorption-specific surface area used herein is a value determined by the BET method according to ASTM D3037-81. The amount of silica added is preferably from 1 to 300 parts by mass, more preferably from 5 to 200 parts by mass, and still more preferably from 10 to 150 parts by mass with respect to 100 parts by mass of the diene-based rubber.

Carbon black is appropriately selected and used depending on the application. In general, carbon black is classified into hard carbon and soft carbon based on the particle size. Soft carbon has low reinforcing properties for rubber, and hard carbon has high reinforcing properties for rubber. In particular, it is preferable to use hard carbon has high reinforcing properties for the rubber composition of the present invention. The amount of carbon black added is preferably from 1 to 300 parts by mass, more preferably from 5 to 200 parts by mass, and still more preferably from 10 to 150 parts by mass with respect to 100 parts by mass of the diene-based rubber. Carbon black may be added to the rubber composition or the silane coupling agent composition.

(Other Processing Aids)

The rubber composition of the present invention may comprise other processing aids such as a vulcanizing agent such as sulfur, a vulcanization accelerator, a vulcanization acceleration aid, an anti-aging agent, a coloring agent, a softener, various oils, an antioxidant, a filler, and a plasticizer within the scope without departing from the spirit of the present invention.

Examples of the vulcanizing agent include: sulfur-based vulcanizing agents such as powdered sulfur, precipitated sulfur, highly dispersible sulfur, surface-treated sulfur, insoluble sulfur, dimorpholine disulfide, and alkylphenol disulfide; zinc oxide, magnesium oxide, litharge, p-quinonedioxam, p-dibenzoylquinonedioxime, tetrachloro-p-benzoquinone, poly-p-dinitrobenzene, methylenedianiline, phenol resin, brominated alkylphenol resin, and chlorinated alkylphenol resin. The content of the vulcanizing agent is preferably from 0.1 to 10 parts by mass and more preferably from 0.5 to 5 parts by mass with respect to 100 parts by mass of the diene-based rubber.

Examples of the vulcanization accelerator include: thiuram-based vulcanization accelerators such as tetramethylthiuram disulfide (TMTD), tetraethylthiuram disulfide (TETD), and tetramethylthiuram monosulfide (TMTM); aldehyde ammonia-based vulcanization accelerators such as hexamethylenetetramine; guanidine-based vulcanization accelerators such as diphenylguanidine; thiazole-based vulcanization accelerators such as 2-mercaptobenzothiazole (MBT) and dibenzothiazyl disulfide (DM); sulfenamide-based vulcanization accelerators such as N-cyclohexyl-2-benzothiazylsulfenamide (CBS) and N-t-butyl-2-benzothiazylsulfenamide (BBS); and dithiocarbamate-based vulcanization accelerators such as zinc dimethyldithiocarbamate (ZnPDC). The content of the vulcanization accelerator is preferably from 0.01 to 10 parts by mass and more preferably from 0.1 to 5 parts by mass with respect to 100 parts by mass of the diene-based rubber.

Examples of the vulcanization acceleration aid include: fatty acids such as acetyl acid, propionic acid, butanoic acid, stearic acid, acrylic acid, and maleic acid; fatty acid zincs such as zinc acetylate, zinc propionate, zinc butanoate, zinc stearate, zinc acrylate, and zinc maleate; and zinc oxides. The content of the vulcanization acceleration aid is preferably from 0.01 to 10 parts by mass and more preferably from 0.1 to 5 parts by mass with respect to 100 parts by mass of the diene-based rubber.

Examples of the anti-aging agent include hindered phenol-based compounds and aliphatic and aromatic hindered amine-based compounds. The content of the anti-aging agent is preferably from 0.01 to 10 parts by mass and more preferably from 0.1 to 5 parts by mass with respect to 100 parts by mass of the diene-based rubber.

Examples of the antioxidant include butyl hydroxytoluene (BHT) and butyl hydroxyanisole (BHA). The content of the antioxidant is preferably from 0.1 to 10 parts by mass and more preferably from 0.5 to 5 parts by mass with respect to 100 parts by mass of the diene-based rubber.

Examples of the coloring agent include: inorganic pigments such as titanium dioxide, zinc oxide, ultramarine, red iron oxide, lithopone, lead, cadmium, iron, cobalt, aluminum, hydrochloride, and sulfate; azo pigments; and copper phthalocyanine pigments. The content of the coloring agent is preferably from 0.1 to 10 parts by mass and more preferably from 0.5 to 5 parts by mass with respect to 100 parts by mass of the diene-based rubber.

According to the present invention, other processing aids can be used as a rubber composition obtained by kneading with a known rubber kneader such as a roll kneader, a Banbury (registered trademark) mixer, a kneader, or the like and carrying out vulcanization under arbitrary conditions. The amounts of the other processing aids to be added can also be a conventional usual amount to be added within the scope without departing from the spirit of the present invention.

[Method for Producing Rubber Composition]

The method for producing the rubber composition of the present invention comprises a step of kneading the silane coupling agent, the diene-based rubber, and the inorganic material described above. The method for producing the rubber composition of the present invention comprises preferably a step of kneading the silane coupling agent, the diene-based rubber, the inorganic material, and the vulcanization acceleration aid described above.

The method for producing the rubber composition of the present invention further comprises preferably a step of kneading the vulcanizing agent. More preferably, the method may comprise a step of kneading the vulcanizing agent and the vulcanization accelerator described above.

In each step described above, the above-described other processing aids can be compounded with the rubber composition within the scope without departing from the spirit of the present invention.

In producing the rubber composition, a conventionally known kneader can be used, and the kneading temperature and time, order of compounding, and the like can be appropriately selected.

[Crosslinked Product of Rubber Composition]

A crosslinked product of the rubber composition can be produced using the rubber composition of the present invention according to a conventionally known method and technical common knowledge widely known to those skilled in the art. For example, the crosslinked product can be produced by extruding the rubber composition, molding the extruded product using a molding machine, and then performing heating and pressurization using a vulcanizer so as to form crosslinks.

[Tire]

The tire of the present invention comprises a crosslinked product of the rubber composition of the present invention. The tire of the present invention can be produced using the above-described rubber composition according to a conventionally known method and technical common knowledge widely known to those skilled in the art. For example, the tire can be produced by extruding the rubber composition, molding the extruded product using a tire molding machine, and then performing heating and pressurization using a vulcanizer so as to form crosslinks. By producing a tire using the rubber composition of the present invention, it is possible to improve wet grip properties and low-fuel consumption in tire performance in a well-balanced manner.

The use of the tire is not particularly limited, but passenger car tires, heavy-duty tires, motorcycle tires, studless tires, and the like can be exemplified.

The shape, structure, size, and material of the tire are not particularly limited and can be appropriately selected according to the purpose. In addition, the rubber composition can be applied to each part of the tire. The part of the tire to which the composition is applied is not particularly limited. The tread, carcass, sidewall, inner liner, undertread, belt portion, and the like of the tire can be appropriately selected according to the purpose. According to the present invention, a pneumatic tire using the rubber composition for tire tread is preferable.

EXAMPLES

The present invention will be described in more detail below with reference to Examples, but the present invention is not limited to these Examples.

Preparation Example 1: Synthesis of Silane Compound 1 (VNB-SSi)

A 100-mL three-necked flask was equipped with a ball stopper, a three-way stopcock connected to a vacuum line or a dry nitrogen line, and a septum. A stirrer bar was then placed in the flask, and while heating with a drier, degassing and nitrogen replacement in the system were repeated 10 times so as to create a normal-pressure nitrogen atmosphere. A syringe was used to inject 27.5 g (0.225 mol) of 2-vinylnorbornene (VNB) into the flask, and 0.074 g (0.45 mmol) of azobisisobutyronitrile was added under a nitrogen atmosphere, followed by nitrogen bubbling for 20 minutes. Next, 10.7 g (0.045 mol) of mercaptopropyltriethoxysilane was aspirated with a gas-tight syringe and the syringe was attached to a metering pump. The pump was set to drip the total amount in 3 hours. Thereafter, the connection was sealed with silicone grease. The needle tip of the gas-tight syringe was introduced through the septum into the flask. The flask was immersed in an oil bath. The bath temperature was gradually increased, and when the internal temperature reached 50° C., the metering pump was activated such that mercaptopropyltriethoxysilane was added dropwise to react. After 2 hours from the completion of the dropwise addition of the total amount, the oil bath was removed from the flask, and the flask was allowed to stand to room temperature. Excess VNB was then distilled off under reduced pressure, thereby obtaining 37.4 g of the colorless clear liquid of interest. FIG. 1 shows the results of $^1$H-NMR measurement of the obtained compound. $^1$H-NMR and $^{13}$C-NMR measurements confirmed that the silane introduction rate was 100% and that the double bond of the norbornene ring had disappeared.

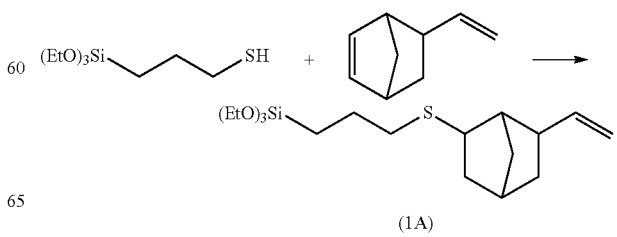

(1A)

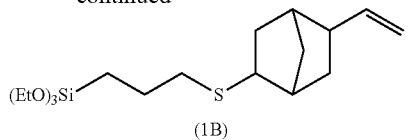

(1B)

[Detection of Stereoisomers of Silane Compound 1]

Figure 2:
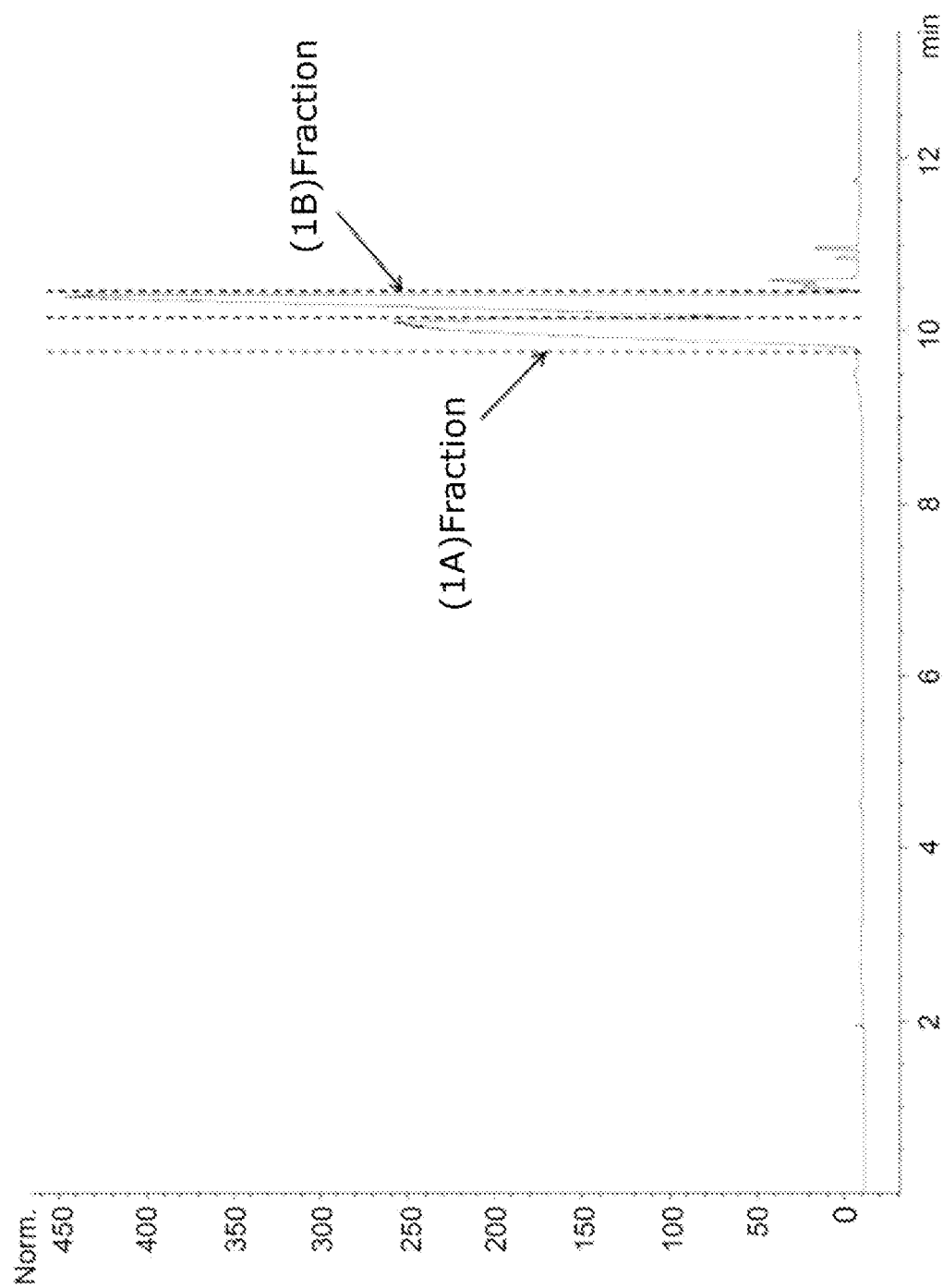
FIG. 2 is a chromatogram showing that the silane compound 1 synthesized in Preparation Example 1 was fractionated into a fraction (1A) and a fraction (1B) by gas chromatography, and each fraction was collected.
Figure 3:
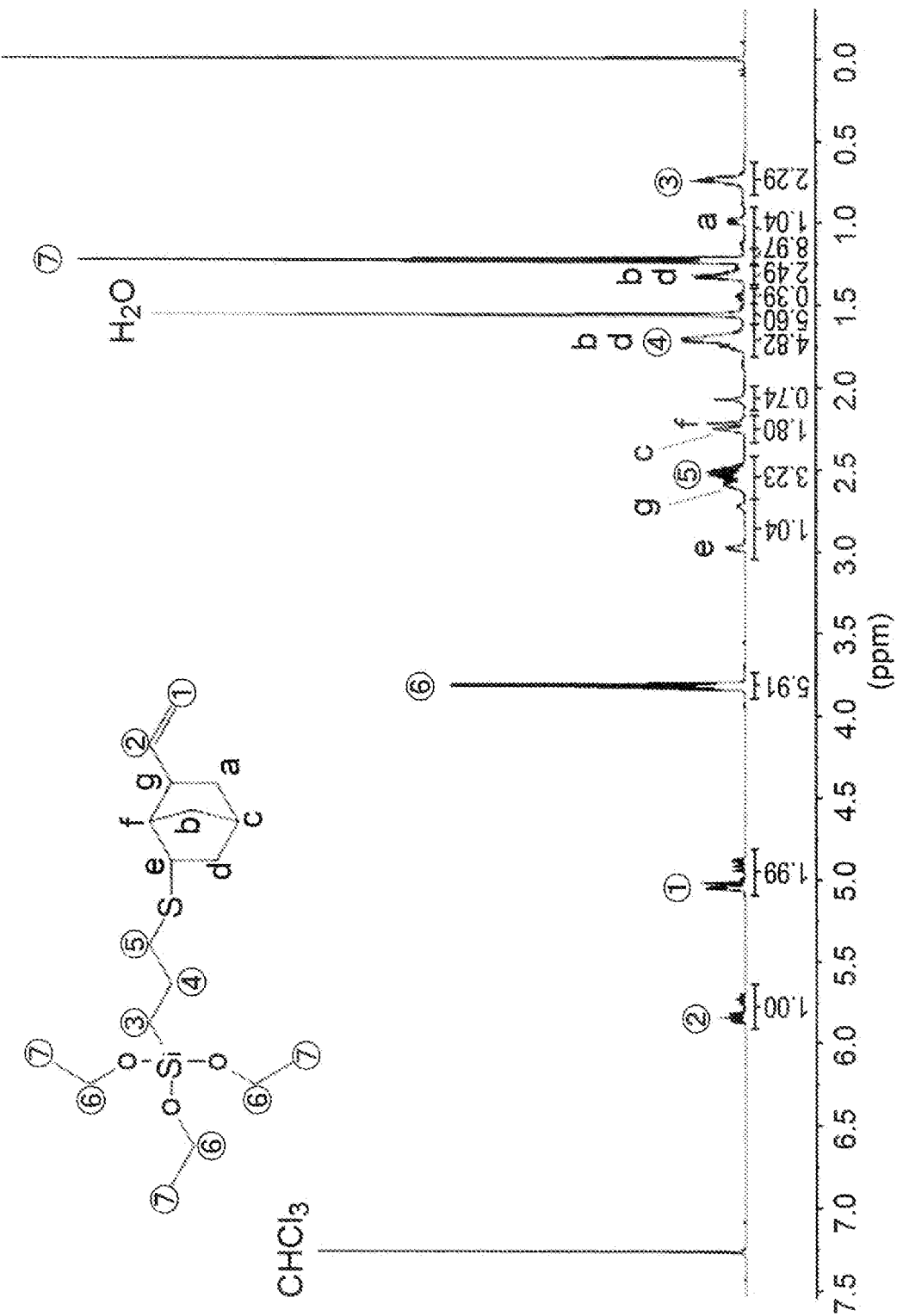
FIG. 3 is a $^1$H-NMR chart of the fraction (1A) of the silane compound 1 synthesized in Preparation Example 1. The peaks indicated by a to g and the circled integers from 1 to 7 indicate the peaks of protons bound to the respective carbon atoms (shown in FIG. 3) of the compound represented by Formula (1A).
Figure 4:
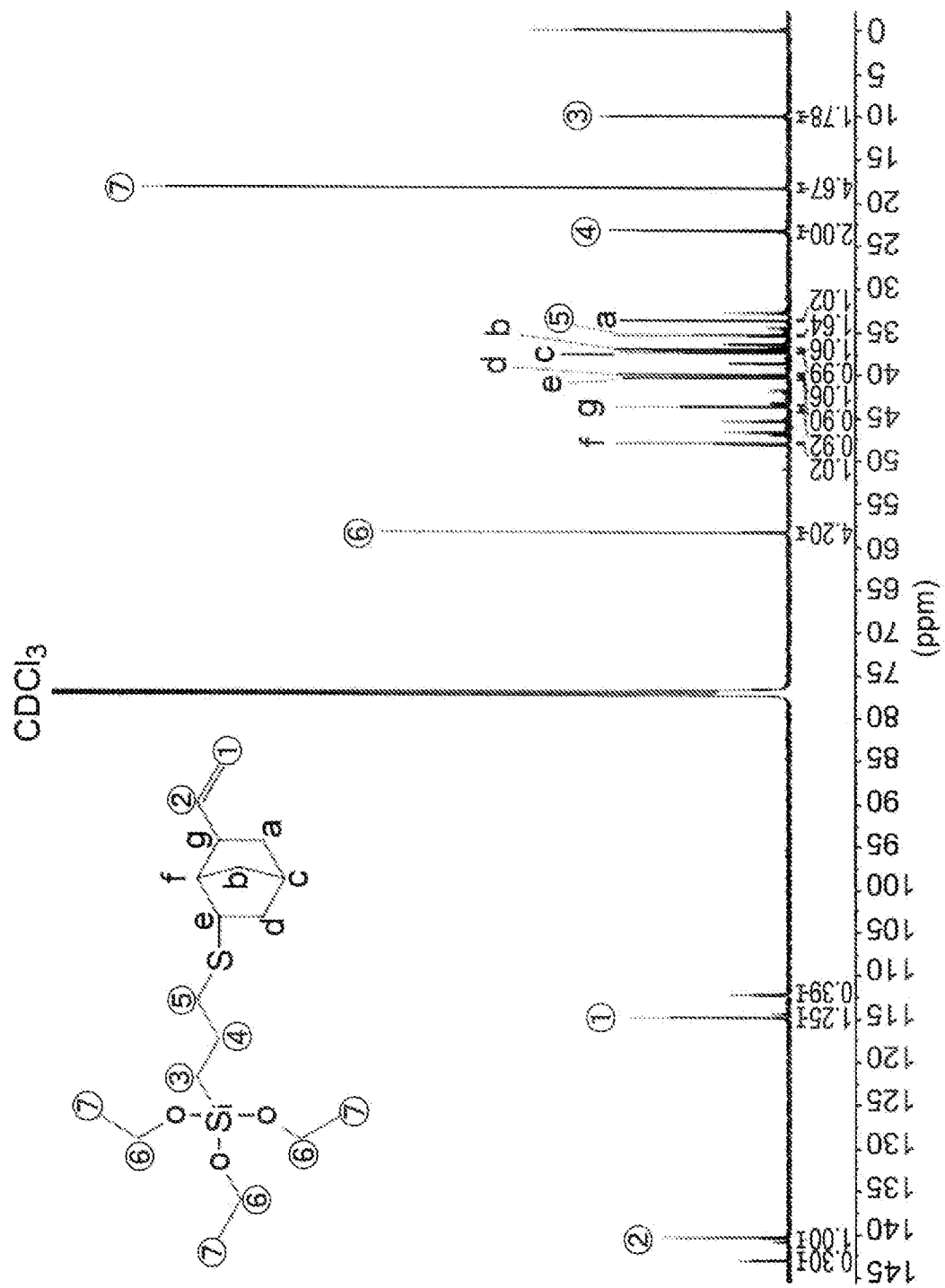
FIG. 4 is a $^{13}$C-NMR chart of the fraction (1A) of the silane compound 1 synthesized in Preparation Example 1. The peaks indicated by a to g and the circled integers from 1 to 7 indicate the peaks of the respective carbon atoms (shown in FIG. 4) of the compound represented by Formula (1A).
Figure 5:
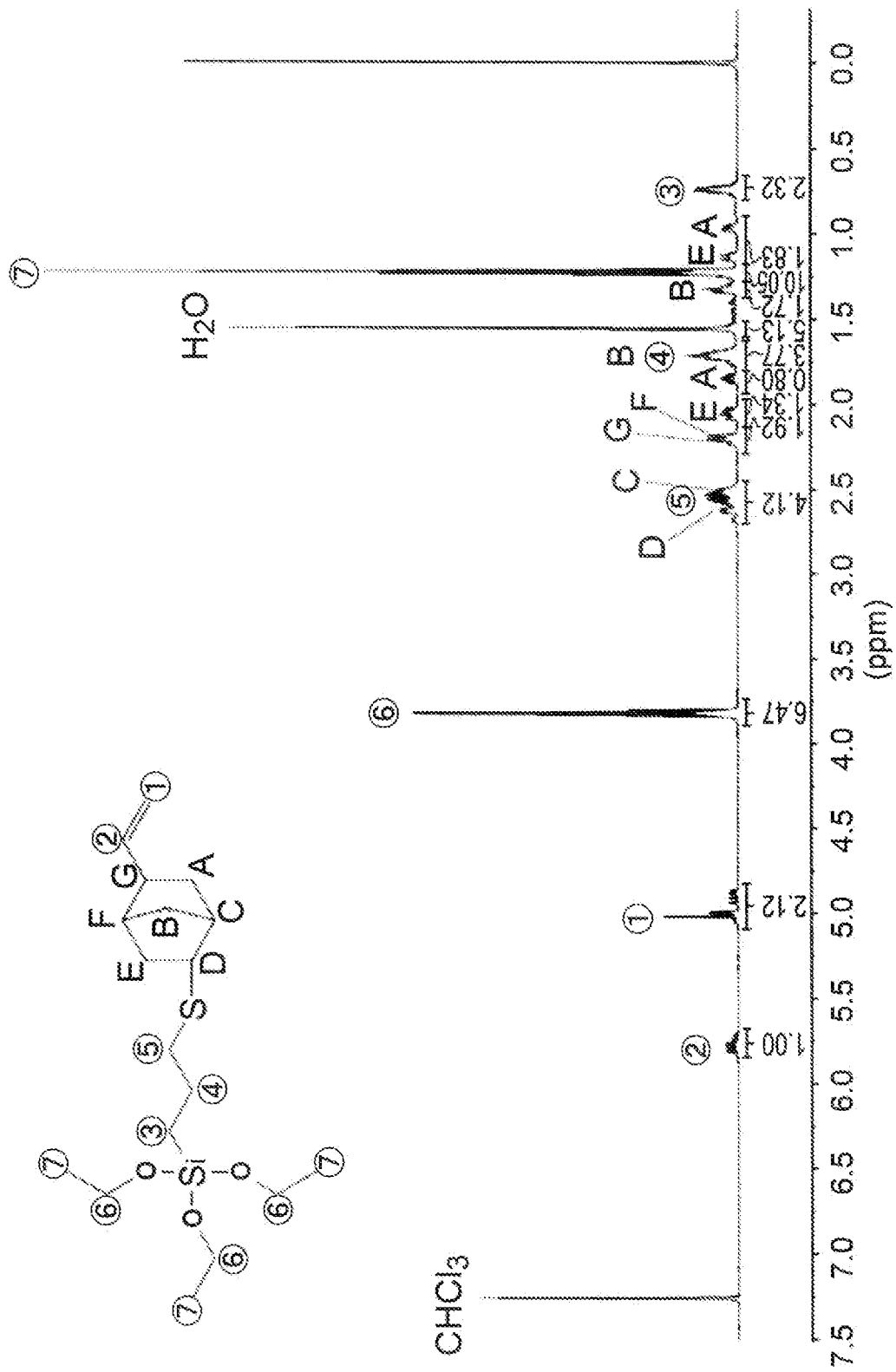
FIG. 5 is a $^1$H-NMR chart of the fraction (1B) of the silane compound 1 synthesized in Preparation Example 1. The peaks indicated by A to G and the circled integers from 1 to 7 indicate the peaks of protons bound to the respective carbon atoms (shown in FIG. 5) of the compound represented by Formula (1B).
Figure 6:
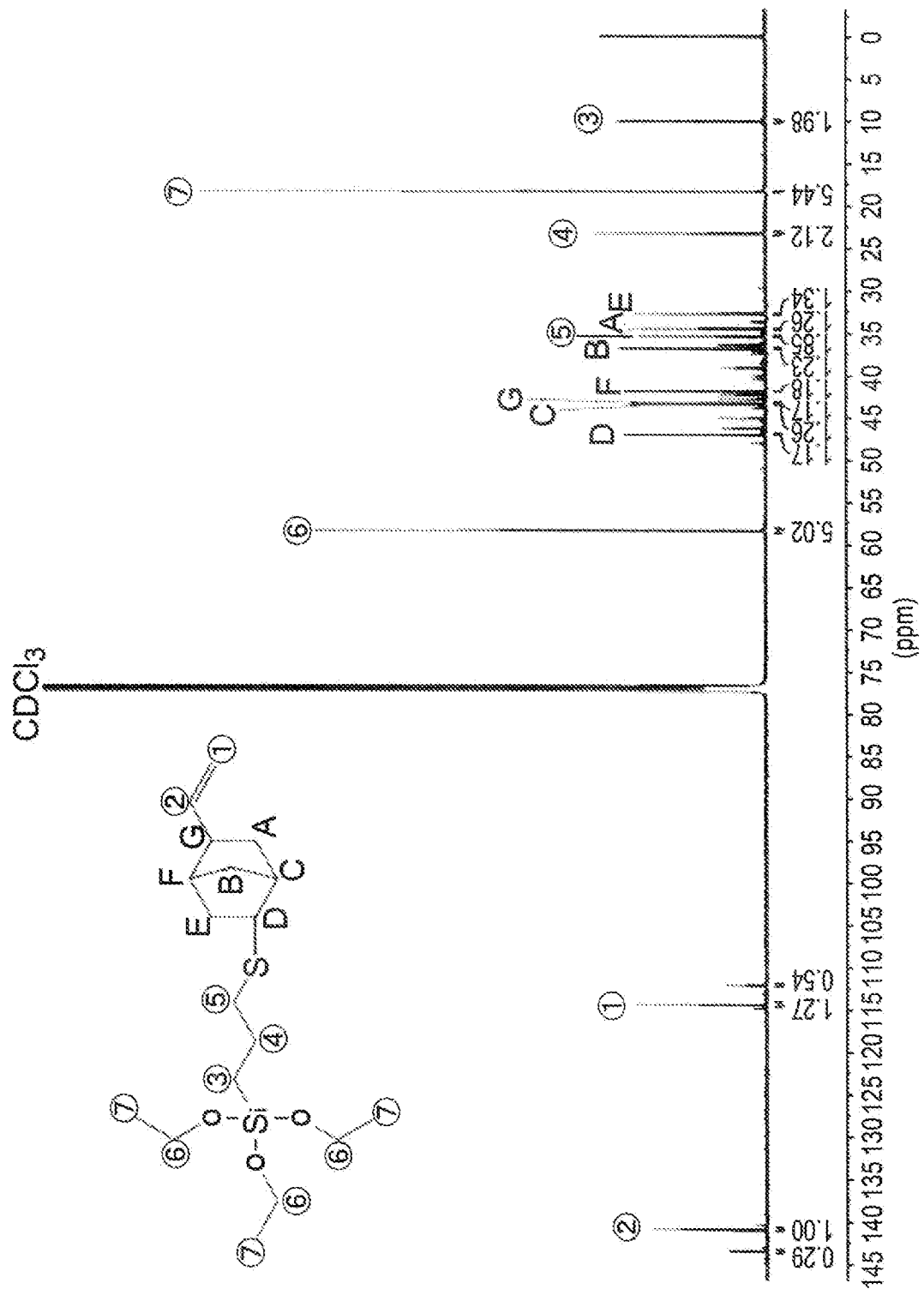
FIG. 6 is a $^{13}$C-NMR chart of the fraction (1B) of the silane compound 1 synthesized in Preparation Example 1. The peaks indicated by A to G and the circled integers from 1 to 7 indicate the peaks of protons bonded to the respective carbon atoms (shown in FIG. 6) of the compound represented by Formula (1B).

The obtained silane compound 1 was fractionated by gas chromatography so as to collect a fraction containing a large amount of the compound represented by the above Formula (1A) ("fraction (1A)") and a fraction containing a large amount of the compound represented by the above Formula (1B) ("fraction (1B)")(FIG. 2). The $^1$H-NMR measurement results of the fraction (1A) are shown in FIG. 3, and the $^{13}$C-NMR measurement results of the fraction (1A) are shown in FIG. 4. In addition, the $^1$H-NMR measurement results of the fraction (1B) are shown in FIG. 5, and the $^{13}$C-NMR measurement results of the fraction (1B) are shown in FIG. 6. It was observed that the peak of proton attached to the carbon atom directly bound to the norbornene ring of the double bond of the vinyl group in the chemical structures represented by Formulas (1A) and (1B) (the carbon atom denoted by the circled integer of 2 in FIG. 3 or FIG. 5) was split. This data suggested the presence of two stereoisomers, i.e., an isomer in which the vinyl group bound to the norbornene ring extends forward in the drawings in the same way as the crosslinked structure of the norbornene ring (syn-isomer) and an isomer in which the vinyl group bound to the norbornene ring extends backward in the drawings opposite to the crosslinked structure of the norbornene ring (anti-isomer). Similarly, the presence of two stereoisomers, i.e., an isomer in which the sulfur group bound to the norbornene ring extends forward in the drawings in the same way as the crosslinked structure of the norbornene ring (syn-isomer) and an isomer in which the sulfur group bound to the norbornene ring extends backward in the drawings opposite to the crosslinked structure of the norbornene ring (anti-isomer), is suggested. From the above, it is surmised that the obtained silane compound 1 is a mixture of eight stereoisomers represented by the following formulas.

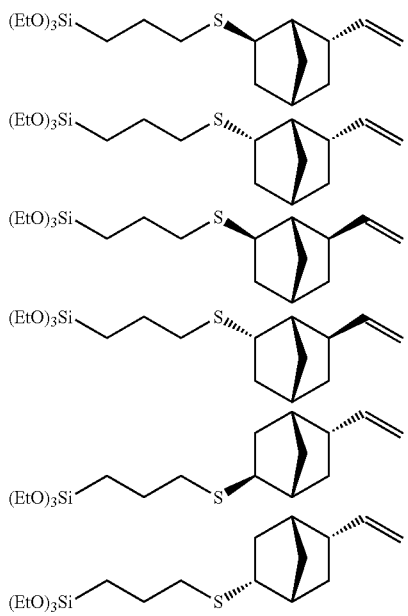

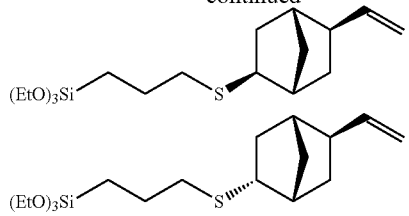

Preparation Example 2: Synthesis of Silane Compound 2 (VNB-2SSi)

A 50-mL three-necked flask was equipped with a ball stopper, a three-way stopcock connected to a vacuum line or a dry nitrogen line, and a septum. A stirrer bar was then placed in the flask, and while heating with a drier, degassing and nitrogen replacement in the system were repeated 10 times so as to create a normal-pressure nitrogen atmosphere. A syringe was used to inject 5.2 g (0.043 mol) of 2-vinyl-norbornene (VNB) and 20.3 g (0.085 mol) of mercaptopropyltriethoxysilane into the flask, and 0.14 g (0.85 mmol) of azobisisobutyronitrile was added under a nitrogen atmosphere, followed by nitrogen bubbling for 20 minutes. Thereafter, the connection was sealed with silicone grease. The flask was immersed in an oil bath. The bath temperature was gradually increased to 50° C. such that the reaction was carried out for 13 hours, and then the temperature was further raised to 70° C. such that the reaction was carried out for 5 hours. Next, mercaptopropyltriethoxysilane was added twice (1st time: 0.10 g (0.85 mmol); 2nd time: 0.26 g (2.13 mmol)) and reacted at 70° C. for 5 hours each time, and then allowed to cool to room temperature, thereby obtaining 25.0 g of the colorless to pale yellow clear liquid of interest.

Figure 7:
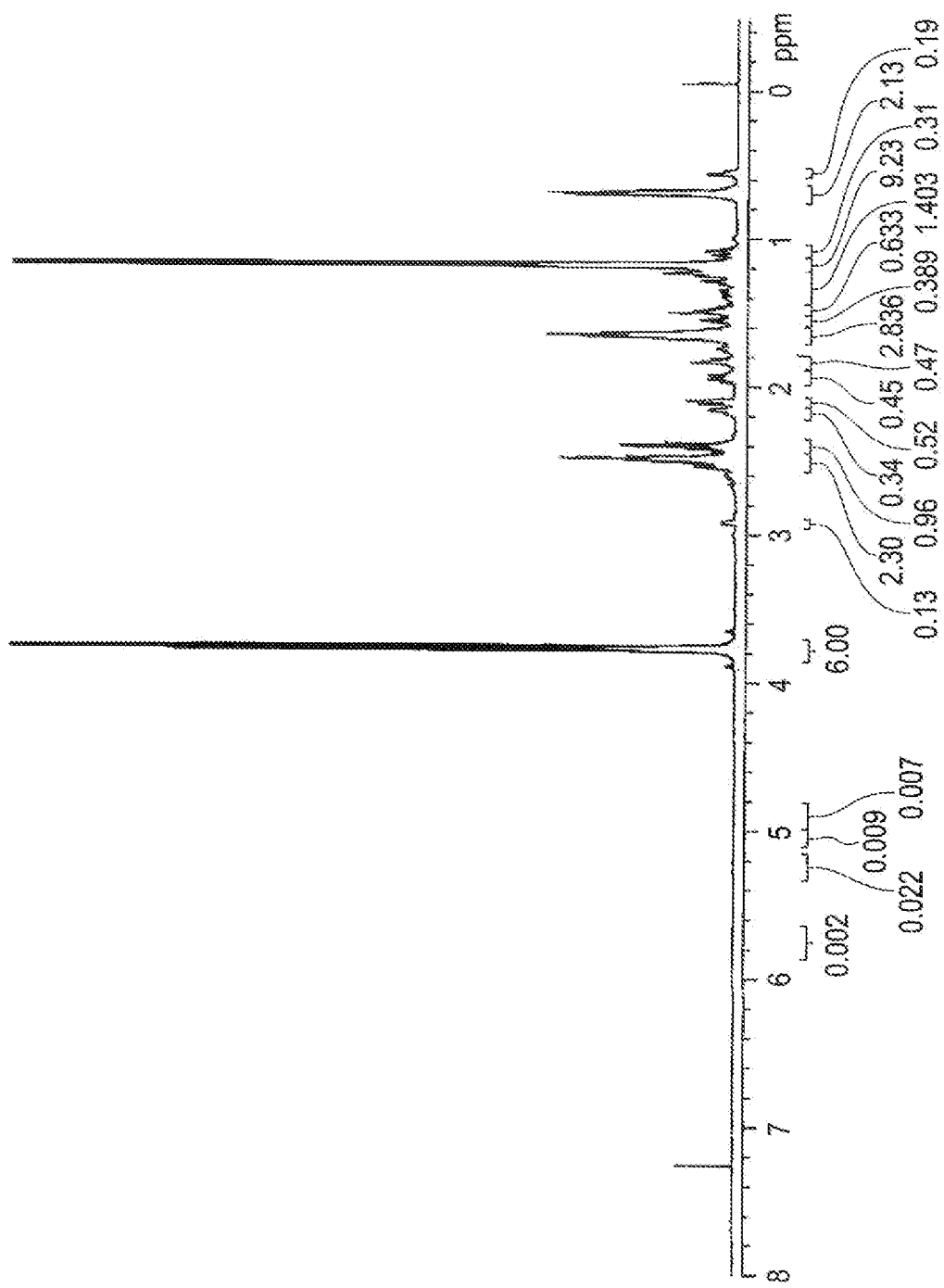
FIG. 7 is a $^1$H-NMR chart of silane compound 2 synthesized in Preparation Example 2.

FIG. 7 shows the results of $^1$H-NMR measurement of the obtained compound. $^1$H-NMR measurement confirmed that the silane introduction rate was 100% and that the double bonds of both the norbornene ring and the vinyl group had disappeared.

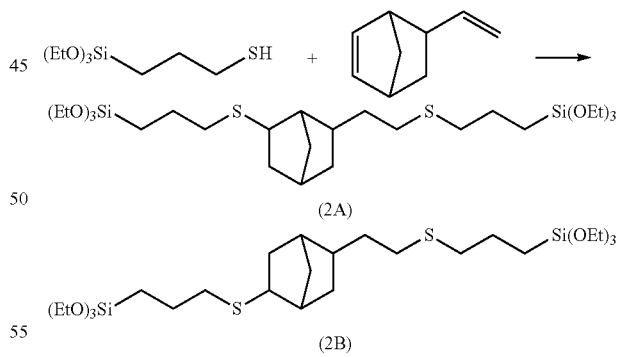

[Detection of Stereoisomers of Silane Compound 2]

FIG. 7 shows the results of $^1$H-NMR measurement of the obtained silane compound 2. $^1$H-NMR measurement confirmed that the double bond of the vinyl group had disappeared. Here, it is surmised that the silane compound 2 is obtained by reacting the vinyl groups of the eight stereoisomers (1-adducts) of the silane compound 1 synthesized in Preparation Example 1 with mercaptosilane, thereby forming a 2-adduct. It is surmised that at that time, the addition to the vinyl group occurs only at the 1-position (outside) of the vinyl group with little steric hindrance, and the addition to the vinyl group maintains the stereoisomerism of the silane compound 1 as it is. From the above, it is surmised that the obtained silane compound 2 is a mixture of eight stereoisomers represented by the following formulas.

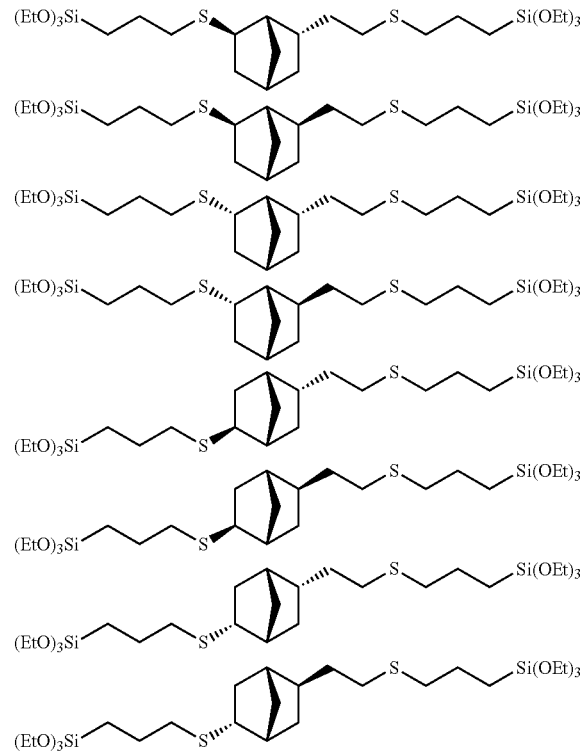

Preparation Example 3: Production of Silane Coupling Agent Composition 1

A 100-mL three-necked flask was equipped with a ball stopper, a three-way stopcock connected to a vacuum line/a dry nitrogen line, a stirring blade, and a three-one motor. The inside of the system was then replaced by flowing nitrogen through the nitrogen line so as to create a normal-pressure nitrogen atmosphere. To the flask, 6.0 g of carbon black (SEAST KH manufactured by Tokai Carbon Co., Ltd.) and 3.0 g of urea were added and mixed by rotating the stirring blade at 60 rpm. Fifteen minutes after the start of stirring, 5.18 g of the silane compound 1 (VNB-SSi) and 0.825 g of the silane compound 2 (VNB-2SSi) were added little by little using droppers. After the addition of the total amount of each, the rotation speed of the stirring blade was increased to 200 rpm for further mixing. After 1 hour, stirring was stopped to obtain 14.9 g of a black granular solid (silane coupling agent composition 1) having a diameter of about 1 to 3 mm.

Example 1-1

(Preparation of Silane Coupling Agent Composition, Rubber Composition, and Rubber Sheet)

First, the total amount of the silane compound 1 (VNB-SSi), the total amount of the silane compound 2 (VNB-2SSi), and the total amount of the protein denaturant 1 (urea) were mixed, thereby obtaining a silane coupling agent composition. Subsequently, the following components were kneaded using a 100-mL kneader (Labo-plastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush. and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 150° C. for 25 minutes, thereby obtaining a vulcanized rubber sheet having a thickness of 2 mm.

Natural rubber (RSS #3 made in Thailand): 100 parts by mass

Silica AQ (trade name: Nipsil AQ manufactured by Tosoh Corporation): 40 parts by mass Zinc oxide No. 3 (trade name: Ginrei R manufactured by Toho Zinc Co., Ltd.): 3 parts by mass Stearic acid (trade name: Stearic acid 300 manufactured by New Japan Chemical Co., Ltd.): 1 part by mass Anti-aging agent (trade name: NOCLAK 6C manufactured by OUCHI SHINKO CHEMICAL INDUSTRIAL CO., LTD.): 1 part by mass Protein denaturant 1 (trade name: Urea manufactured by Wako Pure Chemical Industries, Ltd.): 1 part by mass Silane compound 1 (VNB-SSi) (Preparation Example 1): 3.14 parts by mass Silane compound 2 (VNB-2SSi) (Preparation Example 2): 0.064 parts by mass Sulfur (5% oil-treated sulfur manufactured by Hosoi Chemical Industry Co., Ltd): 2.76 parts by mass Vulcanization accelerator (trade name: NOCSELA CZ manufactured by OUCHI SHINKO CHEMICAL INDUSTRIAL CO., LTD.): 1 part by mass Vulcanization accelerator (trade name: NOCSELA D manufactured by OUCHI SHINKO CHEMICAL INDUSTRIAL CO., LTD.): 0.5 parts by mass Example 1-2

A silane coupling agent composition, a rubber composition, and a rubber sheet were obtained in the same manner as in Example 1-1, except that the amount of the silane compound 1 (VNB-SSi) added was changed to 3.04 parts by mass, and the amount of the silane compound 2 (VNB-2SSi) added was changed to 0.16 parts by mass.

Example 1-3

A silane coupling agent composition, a rubber composition, and a rubber sheet were obtained in the same manner as in Example 1-1 except that the amount of the silane compound 1 (VNB-SSi) added was changed to 2.88 parts by mass, and the amount of the silane compound 2 (VNB-2SSi) added was changed to 0.32 parts by mass.

Example 1-4

A silane coupling agent composition, a rubber composition, and a rubber sheet were obtained in the same manner as in Example 1-1 except that the amount of the silane compound 1 (VNB-SSi) added was changed to 2.72 parts by mass, and the amount of the silane compound 2 (VNB-2SSi) added was changed to 0.48 parts by mass.

Example 1-5

A silane coupling agent composition, a rubber composition, and a rubber sheet were obtained in the same manner as in Example 1-1, except that the amount of the silane compound 1 (VNB-SSi) added was changed to 2.40 parts by mass, and the amount of the silane compound 2 (VNB-2SSi) added was changed to 0.80 parts by mass.

Example 1-6

A silane coupling agent composition, a rubber composition, and a rubber sheet were obtained in the same manner as in Example 1-4, except that the amount of urea added was changed to 0.5 parts by mass.

Example 1-7

A silane coupling agent composition, a rubber composition, and a rubber sheet were obtained in the same manner as in Example 1-1, except that the amount of the silane compound 1 (VNB-SSi) added was changed to 1.36 parts by mass, the amount of the silane compound 2 (VNB-2SSi) added was changed to 0.24 parts by mass, 1.60 parts by mass of the different silane compound (Si69) was added, and the amount of sulfur added was changed to 2.38 parts by mass.

Comparative Example 1-1

A silane coupling agent composition, a rubber composition, and a rubber sheet were obtained in the same manner as in Example 1-1, except that the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 1-2

A silane coupling agent composition, a rubber composition, and a rubber sheet were obtained in the same manner as in Example 1-1, except that the silane compound 1 (VNB-SSi) was not added, and the amount of the silane compound 2 (VNB-2SSi) added was changed to 3.20 parts by mass.

Comparative Example 1-3

A silane coupling agent composition, a rubber composition, and a rubber sheet were obtained in the same manner as in Example 1-4, except that urea was not added.

Evaluation of Physical Properties

The physical properties of the rubber compositions and rubber sheets obtained in Examples 1-1 to 1-7 and Comparative Examples 1-1 to 1-3 were evaluated by the following methods.

(Viscoelasticity)

For the rubber sheets obtained in Examples 1-1 to 1-7 and Comparative Examples 1-1 to 1-3, tan δ was obtained at measurement temperatures of 0° C. and 60° C. using a viscoelasticity measuring system (REOGEL E-4000 manufactured by UBM) according to JIS K 6394 under conditions of a distortion of about 0.1% and a frequency of 10 Hz, and a tan δ balance (=tan δ (0° C.)/tan δ (60° C.)) was calculated from each resulting value. The greater the tan δ balance, the better the viscoelastic properties of the rubber sheet, indicating an excellent balance of wet grip performance and low-fuel consumption as a tire.

(Scorch Resistance)

Using a rotorless Mooney viscometer manufactured by Toyo Seiki Co., Ltd. according to ES K6300, the unvulcanized rubber composition was preheated at 125° C. for 1 minute, and then the time t5 required for the viscosity to increase by 5 Mooney units from the minimum viscosity Vm was measured. The larger the measurement result, the longer the scorch time, indicating excellent workability of the rubber composition.

Table 1 shows the above measurement results and calculation results (tan δ balance). Each measured value and each calculated value are represented by indices of the values in Comparative Example 1-1, each being 100.

TABLE 1

|  |  | Example 1-1 | Example 1-2 | Example 1-3 | Example 1-4 | Example 1-5 | Example 1-6 |
|---|---|---|---|---|---|---|---|
| Rubber composition formulation (parts by mass) | Natural rubber (RSS #3) | 100 | 100 | 100 | 100 | 100 | 100 |
| | Silica AQ | 40 | 40 | 40 | 40 | 40 | 40 |
| | Zinc oxide No. 3 | 3 | 3 | 3 | 3 | 3 | 3 |
| | Stearic acid | 1 | 1 | 1 | 1 | 1 | 1 |
| | Anti-aging agent (NOCLAK 6C) | 1 | 1 | 1 | 1 | 1 | 1 |
| | Protein denaturant 1 (Urea) | 1 | 1 | 1 | 1 | 1 | 0.5 |
| | Silane compound 1 (VNB-SSi) | 3.14 | 3.04 | 2.88 | 2.72 | 2.40 | 2.72 |
| | Silane compound 2 (VNB-2SSi) | 0.064 | 0.16 | 0.32 | 0.48 | 0.80 | 0.48 |
| | Different silane compound (Si69) | 0 | 0 | 0 | 0 | 0 | 0 |

TABLE 1-continued

|  |  | | | | | | |
|---|---|---|---|---|---|---|---|
|  | Sulfur (5% oil-treated) | 2.76 | 2.76 | 2.76 | 2.76 | 2.76 | 2.76 |
|  | Vulcanization accelerator (NOCSELA CZ) | 1 | 1 | 1 | 1 | 1 | 1 |
|  | Vulcanization accelerator (NOCSELA D) | 0.5 | 0.5 | 0.5 | 0.5 | 0.5 | 0.5 |
|  | Ratio of silane compound 2 to the total of silane compounds 1 and 2 (% by mass) | 2 | 5 | 10 | 15 | 25 | 15 |
| Viscoelasticity | tan δ (0° C.) (index) | 96 | 96 | 96 | 94 | 95 | 96 |
|  | tan δ (60° C.) (index) | 88 | 88 | 88 | 85 | 82 | 95 |
|  | tan δ (0° C.)/tan δ (60° C.) (index) | 108 | 109 | 109 | 111 | 116 | 101 |
| Scorch resistance | T5 125° C. (index) | 216 | 223 | 204 | 220 | 214 | 237 |

|  |  | Example 1-7 | Comparative Example 1-1 | Comparative Example 1-2 | Comparative Example 1-3 |
|---|---|---|---|---|---|
| Rubber composition formulation (parts by mass) | Natural rubber (RSS #3) | 100 | 100 | 100 | 100 |
|  | Silica AQ | 40 | 40 | 40 | 40 |
|  | Zinc oxide No. 3 | 3 | 3 | 3 | 3 |
|  | Stearic acid | 1 | 1 | 1 | 1 |
|  | Anti-aging agent (NOCLAK 6C) | 1 | 1 | 1 | 1 |
|  | Protein denaturant 1 (Urea) | 1 | 1 | 1 | 0 |
|  | Silane compound 1 (VNB-SSi) | 1.36 | 0 | 0 | 2.72 |
|  | Silane compound 2 (VNB-2SSi) | 0.24 | 0 | 3.20 | 0.48 |
|  | Different silane compound (Si69) | 1.60 | 3.20 | 0 | 0 |
|  | Sulfur (5% oil-treated) | 2.38 | 2.00 | 2.76 | 2.76 |
|  | Vulcanization accelerator (NOCSELA CZ) | 1 | 1 | 1 | 1 |
|  | Vulcanization accelerator (NOCSELA D) | 0.5 | 0.5 | 0.5 | 0.5 |
|  | Ratio of silane compound 2 to the total of silane compounds 1 and 2 (% by mass) | 15 | 0 | 100 | 15 |
| Viscoelasticity | tan δ (0° C.) (index) | 98 | 100 | 101 | 93 |
|  | tan δ (60° C.) (index) | 91 | 100 | 80 | 113 |
|  | tan δ (0° C.)/tan δ (60° C.) (index) | 108 | 100 | 126 | 82 |
| Scorch resistance | T5 125° C. (index) | 199 | 100 | 185 | 200 |

The results of Examples 1-1 to 1-7 and Comparative Examples 1-1 to 1-3 show that by using a silane coupling agent composition comprising the silane compound 1, the silane compound 2, and urea, the rubber composition had improved scorch resistance, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

Example 2-1

(Preparation of Silane Coupling Agent Composition, Rubber Composition, and Rubber Sheet)

The following components were kneaded using a 100-mL kneader (Labo-plastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, carbon black, zinc oxide, stearic acid, and an anti-aging agent which was weighed out, the total amount of silane coupling agents (silane compound 1 (VNB-SSi) and silane compound 2 (VNB-2SSi)), and the total amount of the protein denaturant 1 (urea) were added. Kneading was carried out for 1 minute and 30 seconds by increasing the rotational speed to 50 rpm. Further, the remaining half amount of the mixture of silica, carbon black, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, carbon black, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained rubber composition was placed in a mold (150 mm×150 mm×2 mm) and heated and pressed at 150° C. for 20 minutes, thereby obtaining a rubber sheet having a thickness of 2 mm.

Natural rubber (RSS #3 manufactured by NZ): 100 parts by mass
Silica AQ (trade name: Nipsil AQ manufactured by Tosoh Corporation): 36.8 parts by mass
Carbon black (trade name: SEAST KH manufactured by Tokai Carbon Co., Ltd.): 3.2 parts by mass
Zinc oxide No. 3 (trade name: Ginrei R manufactured by Toho Zinc Co., Ltd.): 3 parts by mass
Stearic acid (trade name: Stearic acid 300 manufactured by New Japan Chemical Co., Ltd.): 1 part by mass
Anti-aging agent (trade name: NOCLAK 6C manufactured by OUCHI SHINKO CHEMICAL INDUSTRIAL CO., LTD.): 1 part by mass
Protein denaturant 1 (trade name: Urea manufactured by Wako Pure Chemical Industries, Ltd.): 1 part by mass
Silane compound 1 (VNB-SSi) (Preparation Example 1): 2.76 parts by mass
Silane compound 2 (VNB-2SSi) (Preparation Example 2): 0.44 parts by mass
Sulfur (5% oil-treated sulfur manufactured by Hosoi Chemical Industry Co., Ltd): 2.76 parts by mass
Vulcanization accelerator (trade name: NOCSELA CZ manufactured by OUCHI SHINKO CHEMICAL INDUSTRIAL CO., LTD.): 1 part by mass
Vulcanization accelerator (trade name: NOCSELA D manufactured by OUCHI SHINKO CHEMICAL INDUSTRIAL CO., LTD.): 0.5 part by mass Example 2-2

A rubber composition and a rubber sheet were obtained in the same manner as in Example 2-1, except that the mixer kneading operation (i) in Example 2-1 was changed as follows.
(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition 1 (7.4 parts by mass, Preparation Example 3) were added. Kneading was carried out for 1 minute and 30 seconds by increasing the rotational speed to 50 rpm. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

Comparative Example 2-1

A rubber composition and a rubber sheet were obtained in the same manner as in Example 2-1, except that the silane compound 1 (VNB-SSi), the silane compound 2 (VNB-2SSi), and urea were not added, 3.2 parts by mass of the different silane compound (Si69) (manufactured by Degussa AG) was added, and the content of sulfur was changed to 2.00 parts by mass.

Comparative Example 2-2

A rubber composition and a rubber sheet were obtained in the same manner as in Example 2-1, except that the silane compound 1 (VNB-SSi) and the silane compound 2 (VNB-2SSi) were not added, 3.2 parts by mass of the different silane compound (Si69) (manufactured by Degussa AG) was added, and the content of sulfur was changed to 2.00 parts by mass.

Evaluation of Physical Properties

The physical properties of the rubber compositions and rubber sheets obtained in Examples 2-1 to 2-2 and Comparative Examples 2-1 to 2-2 were evaluated by the method described in the evaluation of physical properties in Example 1 above. Table 2 shows the above measurement results and calculation results (tan δ balance). Each measured value and each calculated value are represented by indices of the values in Comparative Example 2-1, each being 100.

TABLE 2

|  |  | Example 2-1 | Example 2-2 | Comparative Example 2-1 | Comparative Example 2-2 |
|---|---|---|---|---|---|
| Rubber composition formulation (parts by mass) | Natural rubber (RSS #3) | 100 | 100 | 100 | 100 |
|  | Silica AQ | 36.8 | 36.8 | 36.8 | 36.8 |
|  | Carbon black | 3.2 | 0 | 3.2 | 3.2 |
|  | Zinc oxide No. 3 | 3 | 3 | 3 | 3 |
|  | Stearic acid | 1 | 1 | 1 | 1 |
|  | Anti-aging agent (NOCLAK 6C) | 1 | 1 | 1 | 1 |
|  | Protein denaturant 1 (Urea) | 1 | 0 | 0 | 1 |
|  | Silane compound 1 (VNB-SSi) | 2.76 | 0 | 0 | 0 |
|  | Silane compound 2 (VNB-2SSi) | 0.44 | 0 | 0 | 0 |
|  | Different silane compound (Si69) | 0 | 0 | 3.2 | 3.2 |
|  | Silane coupling agent composition 1 | 0 | 7.4 | 0 | 0 |
|  | Sulfur (5% oil-treated) | 2.76 | 2.76 | 2.00 | 2.00 |
|  | Vulcanization accelerator (NOCSELA CZ) | 1 | 1 | 1 | 1 |
|  | Vulcanization accelerator (NOCSELA D) | 0.5 | 0.5 | 0.5 | 0.5 |
|  | Ratio of silane compound 2 to the total of silane compounds 1 and 2 (% by mass) | 13.7 | 13.7 | 0 | 0 |
| Viscoelasticity | tan δ (0° C.) (index) | 95 | 98 | 100 | 86 |
|  | tan δ (60° C.) (index) | 88 | 90 | 100 | 104 |
|  | tan δ (0° C.)/tan δ (60° C.) (index) | 108 | 109 | 100 | 83 |
| Scorch resistance | T5 125° C. (index) | 173 | 159 | 100 | 136 |

The results of Examples 2-1 to 2-2 and Comparative Examples 2-1 to 2-2 show that the rubber composition comprising the silane compound 1, the silane compound 2, carbon black, urea, and natural rubber had improved scorch resistance, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

Example 3-1

(Preparation of Silane Coupling Agent Composition, Rubber Composition, and Rubber Sheet)

First, the total amount of the silane compound 1 (VNB-SSi), the total amount of the silane compound 2 (VNB-2SSi), and the total amount of the protein denaturant 2 (Glutaraldehyde 50% aqueous solution) were mixed, thereby obtaining a silane coupling agent composition. Subsequently, the following components were kneaded using a 100-mL kneader (Labo-plastomill manufactured by Toyo Seiki Co., Ltd.), thereby obtaining a rubber composition. Details of the kneading operation performed are as follows: (i) to (iii).
(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.
(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.
(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 150° C. for 25 minutes, thereby obtaining a vulcanized rubber sheet having a thickness of 2 mm.

- Natural rubber (RSS #3 made in Thailand): 100 parts by mass
- Silica AQ (trade name: Nipsil AQ manufactured by Tosoh Corporation): 40 parts by mass
- Zinc oxide No. 3 (trade name: Ginrei R manufactured by Toho Zinc Co., Ltd.): 3 parts by mass
- Stearic acid (trade name: Stearic acid 300 manufactured by New Japan Chemical Co., Ltd.): 1 part by mass
- Anti-aging agent (trade name: NOCLAK 6C manufactured by OUCHI SHINKO CHEMICAL INDUSTRIAL CO., LTD.): 1 part by mass
- Protein denaturant 2 (trade name: Glutaraldehyde 50% aqueous solution manufactured by Tokyo Chemical Industry Co., Ltd. (TCI)): 2 parts by mass
- Silane compound 1 (VNB-SSi) (Preparation Example 1): 2.72 parts by mass
- Silane compound 2 (VNB-2SSi) (Preparation Example 2): 0.48 parts by mass
- Sulfur (5% oil-treated sulfur manufactured by Hosoi Chemical Industry Co., Ltd): 2.76 parts by mass
- Vulcanization accelerator (trade name: NOCSELA CZ manufactured by OUCHI SHINKO CHEMICAL INDUSTRIAL CO., LTD.): 1 part by mass
- Vulcanization accelerator (trade name: NOCSELA D manufactured by OUCHI SHINKO CHEMICAL INDUSTRIAL CO., LTD.): 0.5 part by mass Example 3-2

A silane coupling agent composition, a rubber composition, and a rubber sheet were obtained in the same manner as in Example 3-1, except that the protein denaturant 2 was not added, and 1 part by mass of a protein denaturant 3 (trade name: Dimethyl Suberimidate Dihydrochloride manufactured by Tokyo Chemical Industry Co., Ltd. (TCI)) was added.

Example 3-3

A silane coupling agent composition, a rubber composition, and a rubber sheet were obtained in the same manner as in Example 3-1, except that the protein denaturant 2 was not added, and 1 part by mass of a protein denaturant 4 (trade name: Sodium Dodecyl Sulfate manufactured by Tokyo Chemical Industry Co., Ltd. (TCI)) was added.

Example 3-4

A silane coupling agent composition, a rubber composition, and a rubber sheet were obtained in the same manner as in Example 3-1, except that the protein denaturant 2 was not added, and 1 part by mass of a protein denaturant 5 (trade name: Guanidine hydrochloride manufactured by Tokyo Chemical Industry Co., Ltd. (TCI)) was added.

Comparative Example 3-1

A silane coupling agent composition, a rubber composition, and a rubber sheet were obtained in the same manner as in Example 3-1, except that the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 3-2

A silane coupling agent composition, a rubber composition, and a rubber sheet were obtained in the same manner as in Example 3-2, except that the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 3-3

A silane coupling agent composition, a rubber composition, and a rubber sheet were obtained in the same manner as in Example 3-3, except that the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 3-4

A silane coupling agent composition, a rubber composition, and a rubber sheet were obtained in the same manner as in Example 3-4, except that the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 3-5

A silane coupling agent composition, a rubber composition, and a rubber sheet were obtained in the same manner as in Comparative Example 3-1, except that the protein denaturant 2 was not added.

[Evaluation of Physical Properties]

The viscoelasticity of the rubber sheets obtained in Examples 3-1 to 3-4 and Comparative Examples 3-1 to 3-5, and the scorch resistance of the rubber compositions obtained in the same Examples and Comparative Examples were evaluated by the above-described method in the same manner as in Example 1-1. Table 3 shows the above measurement results and calculation results (tan δ balance). Each measured value and each calculated value are represented by indices of the values in Comparative Example 3-5, each being 100.

TABLE 3

|  |  | Example 3-1 | Example 3-2 | Example 3-3 | Example 3-4 | Comparative Example 3-1 |
|---|---|---|---|---|---|---|
| Rubber composition formulation (parts by mass) | Natural rubber (RSS #3) | 100 | 100 | 100 | 100 | 100 |
| | Silica AQ | 40 | 40 | 40 | 40 | 40 |
| | Zinc oxide No. 3 | 3 | 3 | 3 | 3 | 3 |
| | Stearic acid | 1 | 1 | 1 | 1 | 1 |
| | Anti-aging agent (NOCLAK 6C) | 1 | 1 | 1 | 1 | 1 |
| | Protein denaturant 2 (Glutaraldehyde 50% aqueous solution) | 2 | 0 | 0 | 0 | 2 |
| | Protein denaturant 3 (Dimethyl Suberimidate Dihydrochloride) | 0 | 1 | 0 | 0 | 0 |
| | Protein denaturant 4 (Sodium dodecyl sulfate) | 0 | 0 | 1 | 0 | 0 |
| | Protein denaturant 5 (Guanidine hydrochloride) | 0 | 0 | 0 | 1 | 0 |
| | Silane compound 1 (VNB-SSi) | 2.72 | 2.72 | 2.72 | 2.72 | 0 |
| | Silane compound 2 (VNB-2SSi) | 0.48 | 0.48 | 0.48 | 0.48 | 0 |
| | Different silane compound (Si69) | 0 | 0 | 0 | 0 | 3.20 |
| | Sulfur (5% oil-treated) | 2.76 | 2.76 | 2.76 | 2.76 | 2.00 |
| | Vulcanization accelerator (NOCSELA CZ) | 1 | 1 | 1 | 1 | 1 |
| | Vulcanization accelerator (NOCSELA D) | 0.5 | 0.5 | 0.5 | 0.5 | 0.5 |
| | Ratio of silane compound 2 to the total of silane compounds 1 and 2 (% by mass) | 15 | 15 | 15 | 15 | 0 |
| Viscoelasticity | tan δ (0° C.) (index) | 100 | 97 | 102 | 98 | 97 |
| | tan δ (60° C.) (index) | 95 | 92 | 99 | 91 | 104 |
| | tan δ (0° C.)/tan δ (60° C.) (index) | 105 | 105 | 103 | 108 | 93 |
| Scorch resistance | T5 125° C. (index) | 102 | 232 | 256 | 251 | 48 |

|  |  | Comparative Example 3-2 | Comparative Example 3-3 | Comparative Example 3-4 | Comparative Example 3-5 |
|---|---|---|---|---|---|
| Rubber composition formulation (parts by mass) | Natural rubber (RSS #3) | 100 | 100 | 100 | 100 |
| | Silica AQ | 40 | 40 | 40 | 40 |
| | Zinc oxide No. 3 | 3 | 3 | 3 | 3 |
| | Stearic acid | 1 | 1 | 1 | 1 |
| | Anti-aging agent (NOCLAK 6C) | 1 | 1 | 1 | 1 |
| | Protein denaturant 2 (Glutaraldehyde 50% aqueous solution) | 0 | 0 | 0 | 0 |
| | Protein denaturant 3 (Dimethyl Suberimidate Dihydrochloride) | 1 | 0 | 0 | 0 |
| | Protein denaturant 4 (Sodium dodecyl sulfate) | 0 | 1 | 0 | 0 |
| | Protein denaturant 5 (Guanidine hydrochloride) | 0 | 0 | 1 | 0 |
| | Silane compound 1 (VNB-SSi) | 0 | 0 | 0 | 0 |
| | Silane compound 2 (VNB-2SSi) | 0 | 0 | 0 | 0 |

TABLE 3-continued

|  |  |  |  |  |  |
|---|---|---|---|---|---|
|  | Different silane compound (Si69) | 3.20 | 3.20 | 3.20 | 3.20 |
|  | Sulfur (5% oil-treated) | 2.00 | 2.00 | 2.00 | 2.00 |
|  | Vulcanization accelerator (NOCSELA CZ) | 1 | 1 | 1 | 1 |
|  | Vulcanization accelerator (NOCSELA D) | 0.5 | 0.5 | 0.5 | 0.5 |
|  | Ratio of silane compound 2 to the total of silane compounds 1 and 2 (% by mass) | 0 | 0 | 0 | 0 |
| Viscoelasticity | tan δ (0° C.) (index) | 98 | 100 | 97 | 100 |
|  | tan δ (60° C.) (index) | 99 | 112 | 97 | 100 |
|  | tan δ (0° C.)/tan δ (60° C.) (index) | 99 | 89 | 100 | 100 |
| Scorch resistance | T5 125° C. (index) | 135 | 153 | 126 | 100 |

The results of Examples 3-1 to 3-4 and Comparative Examples 3-1 to 3-5 show that by using a silane coupling agent composition comprising the silane compound 1 (VNB-SSi), the silane compound 2 (VNB-2SSi), and any of the protein denaturants 2 to 5, the rubber composition comprising natural rubber had improved scorch resistance, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

Example 4-1

(Preparation of Silane Coupling Agent Composition, Rubber Composition, and Rubber Sheet)

First, the total amount of the silane compound 1 (VNB-SSi), the total amount of the silane compound 2 (VNB-2SSi), the total amount of the protein denaturant 1 (urea), and the total amount of the protein denaturant 6 (diphenylguanidine) were mixed, thereby obtaining a silane coupling agent composition. Subsequently, the following components were kneaded using a 100-mL kneader (Laboplastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, carbon black, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, carbon black, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 160° C. for 30 minutes, thereby obtaining a vulcanized rubber sheet having a thickness of 2 mm.

Natural rubber (RSS #3 made in Thailand): 100 parts by mass

Silica AQ (trade name: Nipsil AQ manufactured by Tosoh Corporation): 40 parts by mass Carbon black (trade name: SEAST KH manufactured by Tokai Carbon Co., Ltd.): 3.2 parts by mass Zinc oxide No. 3 (trade name: Ginrei R manufactured by Toho Zinc Co., Ltd.): 3 parts by mass Stearic acid (trade name: Stearic acid 300 manufactured by New Japan Chemical Co., Ltd.): 1 part by mass Anti-aging agent (trade name: NOCLAK 6C manufactured by OUCHI SHINKO CHEMICAL INDUSTRIAL CO., LTD.): 1 part by mass Protein denaturant 1 (trade name: Urea manufactured by Wako Pure Chemical Industries, Ltd.): 1 part by mass Protein denaturant 6 (trade name: Diphenylguanidine (DPG) manufactured by OUCHI SHINKO CHEMICAL INDUSTRIAL CO., LTD.): 1 part by mass Silane compound 1 (VNB-SSi) (Preparation Example 1): 2.72 parts by mass Silane compound 2 (VNB-2SSi) (Preparation Example 2): 0.48 parts by mass Sulfur (5% oil-treated sulfur manufactured by Hosoi Chemical Industry Co., Ltd): 2.76 parts by mass Vulcanization accelerator (trade name: NOCSELA CZ manufactured by OUCHI SHINKO CHEMICAL INDUSTRIAL CO., LTD.): 1 part by mass Vulcanization accelerator (trade name: NOCSELA D manufactured by OUCHI SHINKO CHEMICAL INDUSTRIAL CO., LTD.): 0.5 parts by mass Example 4-2

A silane coupling agent composition, a rubber composition, and a rubber sheet were obtained in the same manner as in Example 4-1, except that the amount of diphenylguanidine added was changed to 0.05 parts by mass.

Comparative Example 4-1

A silane coupling agent composition, a rubber composition, and a rubber sheet were obtained in the same manner as in Example 4-1, except that urea, diphenylguanidine, the silane compound 1 (VNB-SSi) and the silane compound 2 (VNB-2SSi) were not added, 3.20 parts by mass of the different silane compound (Si69) was added, and the amount of sulfur added was changed to 2.00 parts by mass.

Comparative Example 4-2

A silane coupling agent composition, a rubber composition, and a rubber sheet were obtained in the same manner as in Comparative Example 4-1, except that 1 part by mass of urea was added.

Comparative Example 4-3

A silane coupling agent composition, a rubber composition, and a rubber sheet were obtained in the same manner as in Comparative Example 4-1, except that 1 part by mass of urea and 1 part by mass of diphenylguanidine were added.

Example 4-3

A silane coupling agent composition, a rubber composition, and a rubber sheet were obtained in the same manner as in Example 4-1, except that the following components were used.
  Natural rubber (RSS #3 made in Thailand): 100 parts by mass
  Silica AQ (trade name: Nipsil AQ manufactured by Tosoh Corporation): 50 parts by mass
  Zinc oxide No. 3 (trade name: Ginrei R manufactured by Toho Zinc Co., Ltd.): 3 parts by mass
  Stearic acid (trade name: Stearic acid 300 manufactured by New Japan Chemical Co., Ltd.): 1 part by mass
  Anti-aging agent (trade name: NOCLAK 6C manufactured by OUCHI SHINKO CHEMICAL INDUSTRIAL CO., LTD.): 1 part by mass
  Protein denaturant 1 (trade name: Urea manufactured by Wako Pure Chemical Industries, Ltd.): 1.25 parts by mass
  Protein denaturant 6 (trade name: Diphenylguanidine (DPG) manufactured by OUCHI SHINKO CHEMICAL INDUSTRIAL CO., LTD.): 1 part by mass
  Silane compound 1 (VNB-SSi) (Preparation Example 1): 3.40 parts by mass
  Silane compound 2 (VNB-2SSi) (Preparation Example 2): 0.60 parts by mass
  Sulfur (5% oil-treated sulfur manufactured by Hosoi Chemical Industry Co., Ltd): 2.95 parts by mass
  Vulcanization accelerator (trade name: NOCSELA CZ manufactured by OUCHI SHINKO CHEMICAL INDUSTRIAL CO., LTD.): 1 part by mass
  Vulcanization accelerator (trade name: NOCSELA D manufactured by OUCHI SHINKO CHEMICAL INDUSTRIAL CO., LTD.): 0.5 parts by mass Comparative Example 4-4

A silane coupling agent composition, a rubber composition, and a rubber sheet were obtained in the same manner as in Example 4-3, except that urea, diphenylguanidine, the silane compound 1 (VNB-SSi), and the silane compound 2 (VNB-2SSi) were not added, 4.00 parts by mass of the different silane compound (Si69) was added, and the amount of sulfur added was changed to 2.00 parts by mass.

Comparative Example 4-5

A silane coupling agent composition, a rubber composition, and a rubber sheet were obtained in the same manner as in Comparative Example 4-4, except that 1.25 parts by mass of urea was added.

[Evaluation of Physical Properties]

The viscoelasticity of the rubber sheets obtained in Examples 4-1 to 4-3 and Comparative Examples 4-1 to 4-5, and the scorch resistance of the rubber compositions obtained in the same Examples and Comparative Examples were evaluated by the above-described method in the same manner as in Example 1-1.

(Unvulcanized Compound Viscosity)

The Mooney viscosities of the rubber compositions obtained in Examples 4-1 to 4-3 and Comparative Examples 4-1 to 4-5 above were determined according to ES K6300 using a Mooney viscometer with an L-type rotor (diameter: 38.1 mm; thickness: 5.5 mm) under conditions of a preheating time of 1 minute, a rotor rotation time of 4 minutes, 100° C., and 2 rpm. The smaller the measurement result, the smaller the viscosity of the rubber composition, indicating excellent workability.

Table 4 shows the above measurement results and calculation results (tan δ balance). The measured values and calculated values of Examples 4-1 and 4-2 and Comparative Examples 4-2 and 4-3 are described as values relative to the values in Comparative Example 4-1, each being 100. The measured values and calculated values of Example 4-3 and Comparative Example 4-5 are described as values relative to the values in Comparative Example 4-4, each being 100.

TABLE 4

| | | Example 4-1 | Example 4-2 | Comparative Example 4-1 | Comparative Example 4-2 | Comparative Example 4-3 | Example 4-3 | Comparative Example 4-4 | Comparative Example 4-5 |
|---|---|---|---|---|---|---|---|---|---|
| Rubber composition formulation (parts by mass) | Natural rubber (RSS #3) | 100 | 100 | 100 | 100 | 100 | 100 | 100 | 100 |
| | Silica AQ | 40 | 40 | 40 | 40 | 40 | 50 | 50 | 50 |
| | Carbon black | 3.2 | 3.2 | 3.2 | 3.2 | 3.2 | 0 | 0 | 0 |
| | Zinc oxide No. 3 | 3 | 3 | 3 | 3 | 3 | 3 | 3 | 3 |
| | Stearic acid | 1 | 1 | 1 | 1 | 1 | 1 | 1 | 1 |
| | Anti-aging agent (NOCLAK 6C) | 1 | 1 | 1 | 1 | 1 | 1 | 1 | 1 |
| | Protein denaturant 1 (Urea) | 1 | 1 | 0 | 1 | 1 | 1.25 | 0 | 1.25 |
| | Protein denaturant 6 (DPG) | 1 | 0.05 | 0 | 0 | 1 | 1 | 0 | 0 |

TABLE 4-continued

|  |  | Example 4-1 | Example 4-2 | Comparative Example 4-1 | Comparative Example 4-2 | Comparative Example 4-3 | Example 4-3 | Comparative Example 4-4 | Comparative Example 4-5 |
|---|---|---|---|---|---|---|---|---|---|
|  | Silane compound 1 (VNB-SSi) | 2.72 | 2.72 | 0 | 0 | 0 | 3.40 | 0 | 0 |
|  | Silane compound 2 (VNB-2SSi) | 0.48 | 0.48 | 0 | 0 | 0 | 0.60 | 0 | 0 |
|  | Different silane compound (Si69) | 0 | 0 | 3.20 | 3.20 | 3.20 | 0 | 4.00 | 4.00 |
|  | Sulfur (5% oil-treated) | 2.76 | 2.76 | 2.00 | 2.00 | 2.00 | 2.95 | 2.00 | 2.00 |
|  | Vulcanization accelerator (NOCSELA CZ) | 1 | 1 | 1 | 1 | 1 | 1 | 1 | 1 |
|  | Vulcanization accelerator (NOCSELA D) | 0.5 | 0.5 | 0.5 | 0.5 | 0.5 | 0.5 | 0.5 | 0.5 |
|  | DPG/Urea | 1 | 0.05 | — | 0 | 1 | 0.8 | — | 0 |
| Unvulcanized compound viscosity | ML1 + 4 (100° C.) (index) | 84 | 91 | 100 | 112 | 112 | 65 | 100 | 98 |
| Viscoelasticity | tan δ (0° C.) (index) | 90 | 95 | 100 | 96 | 89 | 93 | 100 | 99 |
|  | tan δ (60° C.) (index) | 60 | 69 | 100 | 85 | 61 | 44 | 100 | 61 |
|  | tan δ (0° C.)/tan δ (60° C.) (index) | 150 | 138 | 100 | 114 | 146 | 211 | 100 | 162 |
| Scorch resistance | T5 125° C. (index) | 112 | 142 | 100 | 72 | 56 | 186 | 100 | 95 |

The results of Examples 4-1 to 4-3 and Comparative Examples 4-1 to 4-5 show that by using a silane coupling agent composition comprising the silane compound 1 (VNB-SSi), the silane compound 2 (VNB-2SSi), and any of the protein denaturant 1 (urea) and the protein denaturant 6 (diphenylguanidine), the rubber composition comprising natural rubber had decreased viscosity of the unvulcanized compound and improved scorch resistance, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

Example 5-1

(Preparation of Silane Coupling Agent Composition, Rubber Composition, and Rubber Sheet)

First, the total amount of the silane compound 1 (VNB-SSi), the total amount of the silane compound 2 (VNB-2SSi), and the total amount of the silanization reaction accelerator (urea) were mixed, thereby obtaining a silane coupling agent composition. Subsequently, the following components were kneaded using a 100-mL kneader (Laboplastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 160° C. for 30 minutes, thereby obtaining a vulcanized rubber sheet having a thickness of 2 mm.

Synthetic isoprene rubber (trade name: IR-2200 manufactured by Zeon Corporation): 100 parts by mass Silica AQ (trade name: Nipsil AQ manufactured by Tosoh Corporation): 60 parts by mass Zinc oxide No. 3 (trade name: Ginrei R manufactured by Toho Zinc Co., Ltd.): 3 parts by mass Stearic acid (trade name: Stearic acid 300 manufactured by New Japan Chemical Co., Ltd.): 1 part by mass Anti-aging agent (trade name: NOCLAK 6C manufactured by OUCHI SHINKO CHEMICAL INDUSTRIAL CO., LTD.): 1 part by mass Silanization reaction accelerator (trade name: Urea manufactured by Wako Pure Chemical Industries, Ltd.): 1.50 parts by mass Silane compound 1 (VNB-SSi) (Preparation Example 1): 4.27 parts by mass Silane compound 2 (VNB-2SSi) (Preparation Example 2): 0.53 parts by mass Sulfur (5% oil-treated sulfur manufactured by Hosoi Chemical Industry Co., Ltd): 3.14 parts by mass Vulcanization accelerator (trade name: NOCSELA CZ manufactured by OUCHI SHINKO CHEMICAL INDUSTRIAL CO., LTD.): 1.00 part by mass Vulcanization accelerator (trade name: NOCSELA D manufactured by OUCHI SHINKO CHEMICAL INDUSTRIAL CO., LTD.): 0.5 parts by mass Comparative Example 5-1

A silane coupling agent composition, a rubber composition, and a rubber sheet were obtained in the same manner as in Example 5-1, except that the silanization reaction accelerator, the silane compound 1 (VNB-SSi), and the silane compound 2 (VNB-2SSi) were not added, 4.80 parts by mass of the different silane compound (Si69) was added, and the amount of sulfur added was changed to 2.00 parts by mass.

Comparative Example 5-2

A silane coupling agent composition, a rubber composition, and a rubber sheet were obtained in the same manner as in Comparative Example 5-1, except that 1.50 parts by mass of the silanization reaction accelerator was added.

[Evaluation of Physical Properties]

The viscoelasticity of the rubber sheets obtained in Example 5-1 and Comparative Examples 5-1 to 5-2, and the scorch resistance of the rubber compositions obtained in the same Examples and Comparative Examples were evaluated by the above-described method in the same manner as in Example 1-1. The unvulcanized compound viscosity) of the rubber composition was evaluated by the above-described method in the same manner as in Example 4-1. Table 5 shows the above measurement results and calculation results (tan δ balance). Each measured value and each calculated value are represented by indices of the values in Comparative Example 5-1, each being 100.

rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

The invention claimed is:

1. A silane coupling agent composition comprising (a) a silane compound and (b) at least one of a protein denaturant and a silanization reaction accelerator, wherein the silane compound comprises a first silane compound represented by the following Formula (1):

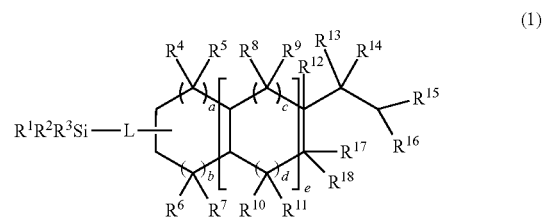

wherein
- $R^1$, $R^2$, and $R^3$ each independently represent a hydrocarbon group optionally containing an oxygen atom or a nitrogen atom, or a hydrogen atom;
- L is a hydrocarbon group optionally containing at least one heteroatom selected from the group consisting of nitrogen, oxygen, and sulfur;
- a is an integer of 0 or 1;
- b is an integer of 0 or 1;

TABLE 5

|  |  | Example 5-1 | Comparative Example 5-1 | Comparative Example 5-2 |
|---|---|---|---|---|
| Rubber composition formulation (parts by mass) | Synthetic isoprene rubber (IR-2000) | 100 | 100 | 100 |
|  | Silica AQ | 60 | 60 | 60 |
|  | Zinc oxide No. 3 | 3 | 3 | 3 |
|  | Stearic acid | 1 | 1 | 1 |
|  | Anti-aging agent (NOCLAK 6C) | 1 | 1 | 1 |
|  | Silanization reaction accelerator (Urea) | 1.50 | 0 | 1.50 |
|  | Silane compound 1(VNB-SSi) | 4.27 | 0 | 0 |
|  | Silane compound 2(VNB-2SSi) | 0.53 | 0 | 0 |
|  | Different silane compound (Si69) | 0 | 4.80 | 4.80 |
|  | Sulfur (5% oil-treated) | 3.14 | 2.00 | 2.00 |
|  | Vulcanization accelerator (NOCSELA CZ) | 1.00 | 1.00 | 1.00 |
|  | Vulcanization accelerator (NOCSELA D) | 0.5 | 0.5 | 0.5 |
|  | Ratio of silane compound 2 to the total of silane compounds 1 and 2 (% by mass) | 11 | 0 | 0 |
| Unvulcanized Compound Viscosity | ML1 + 4(100° C.) (index) | 67 | 100 | 96 |
| Viscoelasticity | tanδ(0° C.) (index) | 93 | 100 | 95 |
|  | tanδ(60° C.) (index) | 81 | 100 | 82 |
|  | tanδ(0° C.)/tanδ(60° C.) (index) | 116 | 100 | 115 |
| Scorch resistance | T5 125° C. (index) | 159 | 100 | 58 |

The results of Example 5-1 and Comparative Examples 5-1 to 5-2 show that by using a silane coupling agent composition comprising the silane compound 1 (VNB-SSi), the silane compound 2 (VNB-2SSi), and the silanization reaction accelerator (urea), the rubber composition comprising synthetic isoprene rubber had decreased viscosity of the unvulcanized compound and improved scorch resistance, and further had improved viscoelastic properties of the

- c is independently an integer of 0 or 1;
- d is independently an integer of 0 or 1;
- e is an integer of 0 to 5;
- $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by —$(CH_2)_f$—;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5;

$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms, and a second silane compound represented by the following Formula (11):

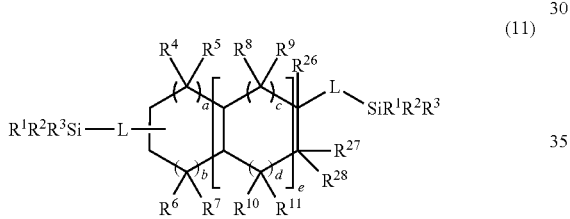

(11)

wherein $R^1$, $R^2$, and $R^3$ each independently represent a hydrocarbon group optionally containing an oxygen atom or a nitrogen atom, or a hydrogen atom;

L is independently a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5;

$R^{26}$, $R^{27}$, and $R^{28}$ each independently represent a hydrogen atom, a methyl group, or an alkyl group having 2 to 10 carbon atoms.

2. The silane coupling agent composition according to claim 1, wherein the first silane compound is a compound represented by the following Formula (2):

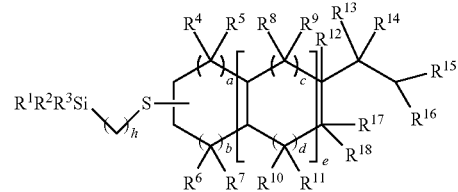

(2)

wherein $R^1$, $R^2$, and $R^3$ each independently represent a hydrocarbon group optionally containing an oxygen atom or a nitrogen atom, or a hydrogen atom;

h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5;

$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

3. The silane coupling agent composition according to claim 1, wherein the second silane compound is a compound represented by the following Formula (12):

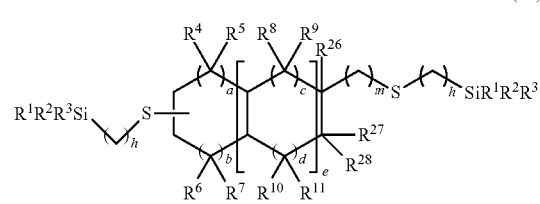

(12)

wherein
R¹, R², and R³ each independently represent a hydrocarbon group optionally containing an oxygen atom or a nitrogen atom, or a hydrogen atom;
h is an integer of 1 to 10;
m is an integer of 1 to 10;
a is an integer of 0 or 1;
b is an integer of 0 or 1;
c is independently an integer of 0 or 1;
d is independently an integer of 0 or 1;
e is an integer of 0 to 5;
$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
f is an integer of 1 to 5;
$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
g is an integer of 1 to 5;
$R^{26}$, $R^{27}$, and $R^{28}$ each independently represent a hydrogen atom, a methyl group, or an alkyl group having 2 to 10 carbon atoms.

4. The silane coupling agent composition according to claim 1, wherein a content of the second silane compound is from 1% to 50% by mass with respect to a total content of the first silane compound and the second silane compound.

5. The silane coupling agent composition according to claim 1, wherein the silane compound further comprises a different silane compound other than first silane compound and the second silane compound.

6. The silane coupling agent composition according to claim 5, wherein the different silane compound is a silane compound represented by the Formula (13):

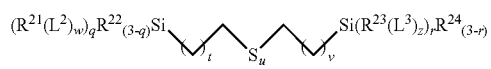
(13)

wherein
t and v are each independently an integer of 0 to 10;
u is an integer of 2 to 10;
q and r are each independently an integer of 1 to 3;
w and z are each independently an integer of 0 or 1,
$L^2$ and $L^3$ are each independently a hydrocarbon group optionally containing at least one heteroatom selected from the group consisting of nitrogen, oxygen, and sulfur;
$R^{21}$ and $R^{23}$ are each independently an alkoxy group or an amino group substituted with one or more alkyl groups;
$R^{22}$ and $R^{24}$ are each independently hydrogen or an alkyl group.

7. The silane coupling agent composition according to claim 1, wherein the protein denaturant is at least one selected from the group consisting of a carbamide compound, a guanidine compound, and a surfactant.

8. The silane coupling agent composition according to claim 1, wherein the silanization reaction accelerator is at least one selected from the group consisting of a carbamide compound and a guanidine compound.

9. The silane coupling agent composition according to claim 7, wherein the carbamide compound is urea.

10. The silane coupling agent composition according to claim 7, wherein the guanidine compound is diphenylguanidine.

11. The silane coupling agent composition according to claim 1, which further comprises carbon black.

12. The silane coupling agent composition according to claim 1, which is used for a natural rubber and/or a synthetic isoprene rubber.

13. A rubber composition comprising the silane coupling agent composition according to claim 1, a diene-based rubber, and silica, wherein
the diene-based rubber comprises at least a natural rubber and/or a synthetic isoprene rubber, and
a total content of the first silane compound and the second silane compound is from 0.5 to 30 parts by mass with respect to 100 parts by mass of the silica.

14. The rubber composition according to claim 13, wherein a content of the silica is from 0.5 to 300 parts by mass with respect to 100 parts by mass of the diene-based rubber.

15. The rubber composition according to claim 13, which is used for a tire.

16. A crosslinked product of the rubber composition according to claim 13.

17. A pneumatic tire in which the crosslinked product according to claim 16 is used for a tire tread.

* * * * *